(12) United States Patent
Miracle et al.

(10) Patent No.: US 10,876,079 B2
(45) Date of Patent: *Dec. 29, 2020

(54) BIS-AZO COLORANTS FOR USE AS BLUING AGENTS

(75) Inventors: Gregory Scot Miracle, Hamilton, OH (US); Robert L. Mahaffey, Spartanburg, SC (US); Xiaoyong Michael Hong, Greer, SC (US); Eduardo Torres, Boiling Springs, SC (US); Dominick J. Valenti, Greenville, SC (US)

(73) Assignee: The Procter & Gamble Company, Cincinnati, OH (US)

( * ) Notice: Subject to any disclaimer, the term of this patent is extended or adjusted under 35 U.S.C. 154(b) by 201 days.

This patent is subject to a terminal disclaimer.

(21) Appl. No.: 13/313,256

(22) Filed: Dec. 7, 2011

(65) Prior Publication Data

US 2012/0129751 A1 May 24, 2012

Related U.S. Application Data

(63) Continuation of application No. PCT/US2011/057290, filed on Oct. 21, 2011, which is a continuation of application No. 12/910,258, filed on Oct. 22, 2010, now abandoned.

(51) Int. Cl.
| | | |
|---|---|---|
| C11D 3/42 | (2006.01) | |
| C09B 31/072 | (2006.01) | |
| C09B 69/10 | (2006.01) | |
| C09B 69/00 | (2006.01) | |
| C11D 3/34 | (2006.01) | |
| C11D 11/00 | (2006.01) | |

(52) U.S. Cl.
CPC ............ *C11D 3/42* (2013.01); *C09B 31/072* (2013.01); *C09B 69/00* (2013.01); *C09B 69/10* (2013.01); *C09B 69/106* (2013.01); *C11D 3/349* (2013.01); *C11D 11/0017* (2013.01)

(58) Field of Classification Search
CPC ... C11D 3/40; C11D 17/0039; C11D 11/0017; C11D 11/0064; C11D 3/42; C11D 3/349; C09B 69/00; C09B 31/072; C09B 69/10; C09B 69/106; C09B 31/08
USPC .................. 252/526, 527, 539; 8/26, 41, 77
See application file for complete search history.

(56) References Cited

U.S. PATENT DOCUMENTS

| | | | |
|---|---|---|---|
| 3,725,384 A | | 4/1973 | Zickendraht et al. |
| 3,762,859 A | * | 10/1973 | Wixon et al. ..................... 8/680 |
| 4,597,898 A | * | 7/1986 | Vander Meer ..... C08G 65/2624 510/321 |
| 5,332,806 A | | 7/1994 | Hurter |
| 6,031,023 A | | 2/2000 | Carroll |
| 6,348,441 B1 | * | 2/2002 | Aiken et al. .................. 510/304 |
| 6,482,994 B2 | * | 11/2002 | Scheper ................. C08G 65/22 568/616 |
| 7,018,977 B2 | | 3/2006 | Martens et al. |
| 8,378,083 B2 | * | 2/2013 | Mahaffey, Jr. ........ C09B 31/072 534/729 |
| 8,962,815 B2 | * | 2/2015 | Mahaffey, Jr. ........ C09B 31/072 534/836 |
| 9,938,412 B2 | * | 4/2018 | Mahaffey, Jr. ........ C09B 31/072 |
| 2003/0054969 A1 | * | 3/2003 | Fumagalli et al. ........... 510/394 |
| 2006/0122093 A1 | | 6/2006 | Permejo |
| 2006/0287211 A1 | * | 12/2006 | Barbizan ................ C11D 3/001 510/367 |
| 2007/0083040 A1 | | 4/2007 | Hasemann |
| 2007/0191250 A1 | * | 8/2007 | Lant .................... C11D 3/38627 510/392 |
| 2012/0101018 A1 | | 4/2012 | Miracle et al. |
| 2012/0129751 A1 | | 5/2012 | Miracle |
| 2015/0126717 A1 | | 5/2015 | Mahaffey, Jr. |
| 2015/0291918 A1 | | 10/2015 | Miracle |

FOREIGN PATENT DOCUMENTS

| | | | |
|---|---|---|---|
| DE | 1153476 B | | 8/1963 |
| GB | 973885 | | 10/1964 |
| GB | 2036779 A | | 7/1980 |
| JP | S59-75952 A | | 4/1984 |
| JP | S61-151269 A | | 7/1986 |
| WO | WO9404613 A1 | | 3/1994 |
| WO | WO 2005/040286 | * | 5/2005 |
| WO | WO 2007/087257 | * | 8/2007 |
| WO | WO 2007/087257 A2 | | 8/2007 |
| WO | WO 2010/024468 | * | 3/2010 |
| WO | WO2010024468 A1 | | 3/2010 |

OTHER PUBLICATIONS

Wikipedia visible light spectrum definition pp. 1-2, 2018.*
EPO translation of German 1153476 2019.*
International Search Report, for U.S. Appl. No. 12/910,258, dated Jul. 15, 2011, containing 10 pages.
International Search Report dated Mar. 20, 2012, containing 38 pages.

* cited by examiner

*Primary Examiner* — Gregory R Delcotto
*Assistant Examiner* — Preeti Kumar
(74) *Attorney, Agent, or Firm* — Gary J. Foose

(57) ABSTRACT

Bis-azo colorants for use as bluing agents, laundry care compositions including bis-azo colorants that may serve as bluing agents, processes for making such bluing agents and laundry care compositions and methods of using the same. The bluing agents are generally include at least two components: at least one chromophore component and at least one polymeric component. These bluing agents are advantageous in providing a whitening effect to fabrics, while not building up over time and causing undesirable blue discoloration to the treated fabrics.

8 Claims, No Drawings

BIS-AZO COLORANTS FOR USE AS BLUING AGENTS

CROSS REFERENCE TO RELATED APPLICATION

This application is a continuation of International Application No. PCT/US2011/57290, filed Oct. 21, 2011, which is a continuation of U.S. application Ser. No. 12/910,258, filed Oct. 22, 2010 now abandoned.

PARTIES TO A JOINT RESEARCH AGREEMENT STATEMENT

The present claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are THE PROCTER & GAMBLE COMPANY and MILLIKEN & COMPANY.

TECHNICAL FIELD

This invention relates to bis-azo colorants for use as bluing agents, laundry care compositions comprising bis-azo colorants that may serve as bluing agents, processes for making such bluing agents and laundry care compositions and methods of using the same. The bluing agents are generally comprised of at least two components: at least one chromophore component and at least one polymeric component. These bluing agents are advantageous in providing a whitening effect to fabrics, while not building up over time and causing undesirable blue discoloration to the treated fabrics.

BACKGROUND

As textile substrates age, their color tends to fade or yellow due to exposure to light, air, soil, and natural degradation of the fibers that comprise the substrates. Thus, the purpose of bluing agents is generally to visually brighten these textile substrates and counteract the fading and yellowing of the substrates. Typically, bluing agents may be found in laundry detergents, fabric softeners, or rinse aids and are therefore applied to textile substrates during the laundering process. However, it is important that bluing agents function to brighten treated textile substrates without causing undesirable staining of the textile substrates. Cellulosic substrates, in particular, tend to exhibit a yellow hue after exposure to light, air, and/or soiling. This yellowness is often difficult to reverse by normal laundering procedures. As a result, there exists a need for improved bluing agents which are capable of eliminating the yellowness exhibited by ageing cellulosic substrates. By utilizing such improved bluing agents, the life of the textile substrates, such as clothing articles, table linens, etc., may be extended. Unfortunately, current bluing agents either do not provide a hueing benefit after a single treatment cycle and/or they build up to an undesirable level, thus over hueing the treated situs over multiple treatment cycles.

The present invention offers advantages over previous efforts in this area, as this invention takes advantage of compounds having a non-sulfonic acid substituent in the terminal phenyl ring of the bis-azo structure. Sulfonic acid groups are known to promote the deposition and staining of acid dyes on cellulosic fabrics. These groups are also essential for the solubility and compatibility of the dyes in laundry formulations. While it is necessary that bluing agents deposit from wash water, it is undesirable that they stain the fabric by inadvertent contact or by building up over time, i.e. overhueing. Applicants recognized that modification or replacement of the sulfonic acid group at the phenyl terminal end of the bis-azo with a nonionic solubilizing group allows for good deposition of the bis-azo but attenuates its staining and overhueing tendencies and still allows the bluing agent to be compatible in laundry formulations. In short, Applicants recognized the source of the current hueing deficiencies and herein provide the solution to such problem. The hueing compounds disclosed herein also absorb light at a wavelength appropriate to neutralize the yellowness of cellulosic substrates. These compounds function ideally as bluing agents for cellulosic substrates and may be incorporated into laundry care compositions for use by consumers.

SUMMARY OF INVENTION

This invention relates to laundry care compositions comprising bis-azo colorants that may serve as bluing agents, processes for making such laundry care compositions and methods of using the same. The bluing agents are generally comprised of at least two components: at least one chromophore component and at least one polymeric component. These bluing agents are advantageous in providing a whitening effect to fabrics, while not building up over time and causing undesirable blue discoloration to the treated fabrics.

DETAILED DESCRIPTION

As used herein, the term "alkoxy" is intended to include $C_1$-$C_6$ alkoxy and alkoxy derivatives of polyols having repeating units such as butylene oxide, glycidol oxide, ethylene oxide or propylene oxide.

As used herein, the terms "alkyl" and "alkyl capped" are intended to include $C_1$-$C_6$ alkyl groups.

The terms "ethylene oxide," "propylene oxide" and "butylene oxide" shown herein by their typical designation of "EO," "PO" and "BO," respectively.

As used herein, the term "laundry care composition" includes, unless otherwise indicated, granular, powder, liquid, gel, paste, unit dose bar form and/or flake type washing agents and/or fabric treatment compositions.

As used herein, the term "fabric treatment composition" includes, unless otherwise indicated, fabric softening compositions, fabric enhancing compositions, fabric freshening compositions and combinations there of. Such compositions may be, but need not be rinse added compositions.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the articles including "the", "a" and "an" when used in a claim, are understood to mean one or more of what is claimed or described.

As used herein, the terms "include", "includes" and "including" are meant to be non-limiting.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein, Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

Suitable Bluing Agents

The bluing agents employed in the present laundry care compositions may be dyes, pigments, or polymeric colorants, preferably dyes, comprising a chromophore constituent and a polymeric constituent. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

In one aspect, the bluing agent employed in the present laundry care compositions may have the following general structure (I):

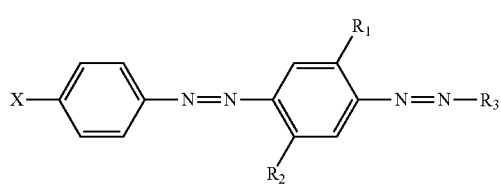

wherein:
$R_1$ and $R_2$ are independently H, alkyl, alkoxy, alkyleneoxy, alkyl capped alkyleneoxy, polyalkyleneoxy, alkyl capped polyalkyleneoxy, urea, amido or acetamido;
$R_3$ is an aryl group substituent that may be a substituted phenyl or napthyl moiety;
X is an oxygen, nitrogen or sulfonamido group further substituted with a substituted or unsubstituted amino, or a substituted or unsubstituted sulfonamide group, wherein the substituents are selected from the group consisting of alkyl, alkyleneoxy, polyalkyleneoxy, or phenyl moieties wherein the phenyl group may be further substituted with alkyl, alkyleneoxy or polyalkyleneoxy moieties.

Preferably $R_1$ and $R_2$ are independently selected from the group consisting of H, alkyl, alkoxy, alkyleneoxy, alkyl capped alkyleneoxy and amido. Or, $R_1$ and $R_2$ are independently H, alkyl, alkoxy, alkyleneoxy, polyalkyleneoxy, or acetamido. In a preferred aspect, $R_1$ is an alkoxy group and $R_2$ is an alkyl or alkoxy group. In one preferred aspect, X is an oxygen, nitrogen or sulfonamido group further substituted with alkyl, alkyleneoxy, polyalkyleneoxy, or phenyl moieties wherein the phenyl group may be further substituted with alkyl, alkyleneoxy or polyalkyleneoxy moieties. In one preferred aspect, X is a substituted group comprising sulfonamide moiety and optionally alkyl and/or aryl moiety, and wherein the substituent group comprises at least one alkylenoxy chain that comprises at least 4 alkyleneoxy moieties.

In another aspect, suitable bluing agents may have the following general Structure (II):

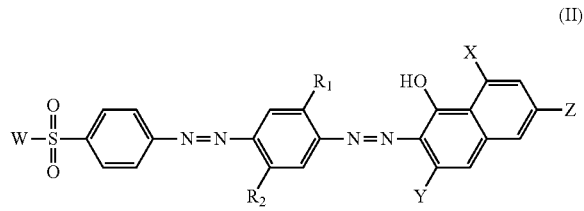

wherein:
$R_1$ and $R_2$ are independently H, alkyl, alkoxy, or acetamido;
W is a substituted amino moiety;
X is a hydrogen, an amino group or an amino group substituted with an acyl group;
Y is a hydrogen or a sulfonic acid moiety; and
Z is a sulfonic acid moiety or an amino group substituted with a phenyl group.

In further aspects, suitable bluing agents may have the following general Structure (III):

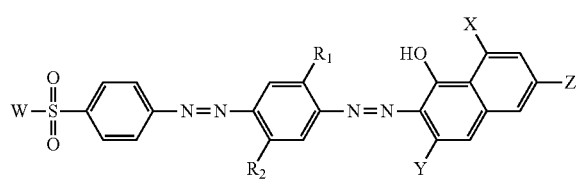

wherein:
$R_1$ is alkoxy;
$R_2$ is alkyl;
W is a substituted amino moiety;

X is a hydrogen, an amino group or an amino group substituted with an acyl group;
Y is a hydrogen or a sulfonic acid moiety; and
Z is a sulfonic acid moiety or an amino group substituted with a phenyl group.

In one aspect, said bluing agent may comprise:
(a) at least one chromophore component that comprises a bio azo colorant, and
(b) at least one polymeric component or substituted sulfonamide component;
wherein the bluing agent has the following structure:

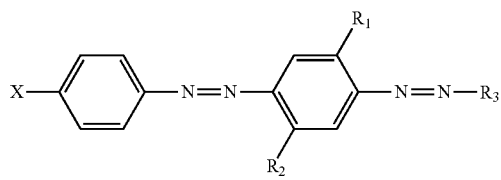

wherein:
R$_1$ and R$_2$ are independently H, alkyl, alkoxy, alkyleneoxy, alkyl capped alkyleneoxy, polyalkyleneoxy, alkyl capped polyalkyleneoxy, urea, or amido;
R$_3$ is an aryl group substituent that may be a substituted phenyl or napthyl moiety;
X is a substituted oxygen, a substituted or unsubstituted amino, or a substituted or unsubstituted sulfonamide group wherein the substituents are selected from the group consisting of alkyl, alkyleneoxy, polyalkyleneoxy, or phenyl moieties wherein the phenyl group may be further substituted with alkyl, alkyleneoxy or polyalkyleneoxy moieties.

In one aspect, said bluing agent may comprise a polyoxyalkylene chain having from 2 to about 30 repeating units.

In one aspect, said bluing agent may comprise a polyoxyalkylene chain having from 2 to about 20 repeating units.

In one aspect, said bluing agent may comprise a polyoxyalkylene chain having from 2 to about 10 repeating units.

In one aspect, bluing agent may comprise a polyoxyalkylene chain having from about 4 to about 6 repeating units.

In one aspect, bluing agent may comprise an alkoxylated bis-azo polymeric colorant.

In one aspect, bluing agent's chromophore may exhibit an absorbance spectrum maximum in water of from about 520 nanometers to about 640 nanometers.

In one aspect, said bluing agent's chromophore may exhibit an absorbance spectrum maximum in water of from about 560 nanometers to about 610 nanometers.

In one aspect, said bluing agent may exhibit an absolute hue angle in the range of 265° to 310°.

In aspect said, bluing agent may exhibit an absolute hue angle in the range of 273° to 287°.

In one aspect, said bluing agent may have the following structure:

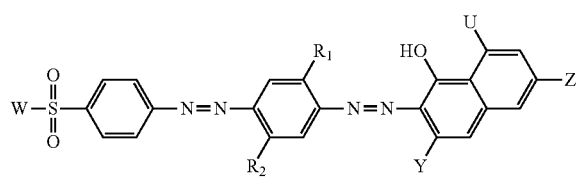

wherein:
R$_1$ and R$_2$ are independently H, alkyl, alkoxy, alkyleneoxy, alkyl capped alkyleneoxy, polyalkyleneoxy, alkyl capped polyalkyleneoxy, or amido;
W is a substituted amino moiety;
U is a hydrogen, an amino group or an amino group substituted with an acyl group;
Y is a hydrogen or a sulfonic acid moiety; and
Z is a sulfonic acid moiety or an amino group substituted with a phenyl group.

In one aspect, of said bluing agent, R$_1$ is alkoxy and R$_2$ is alkyl.

In one aspect of the invention, suitable bluing agents include, but are not limited to the following structures:

Formula BA1 (Example 14)

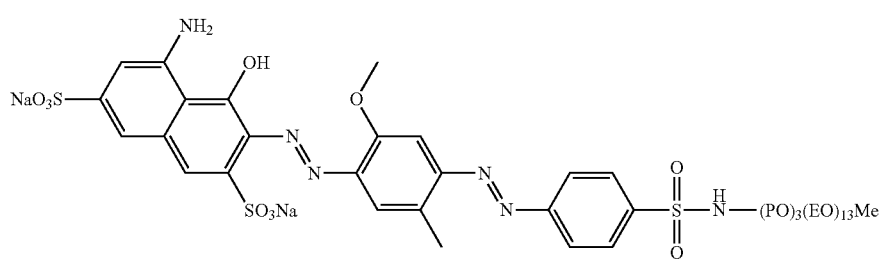

Formula BA2 (Example 9)

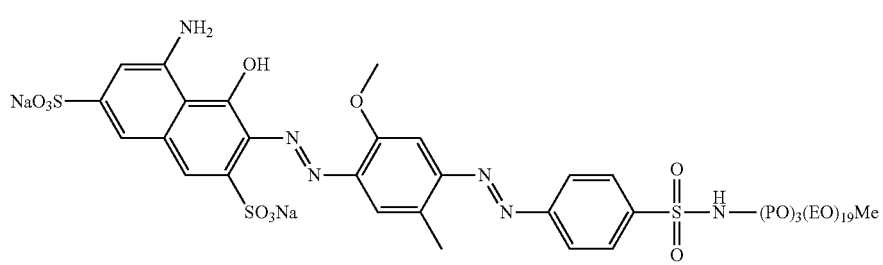

Formula BA3
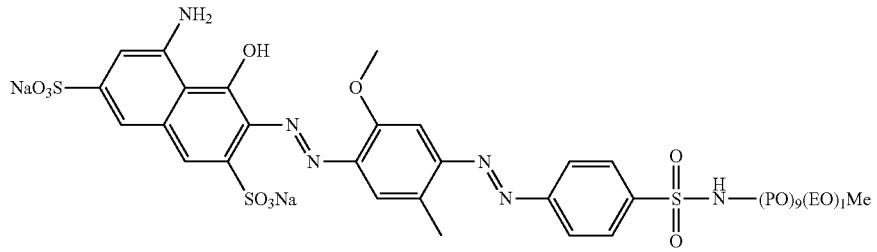
Formula BA4 (Example 1)
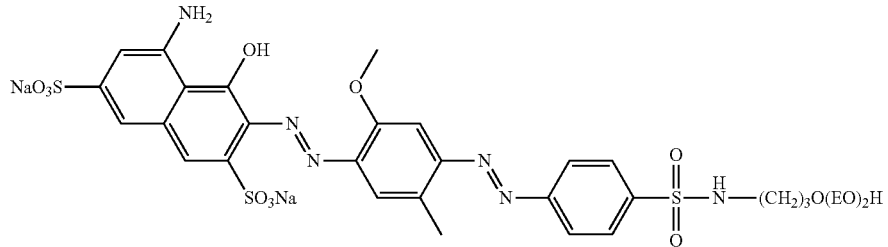
Formula BA5 (Example 6)
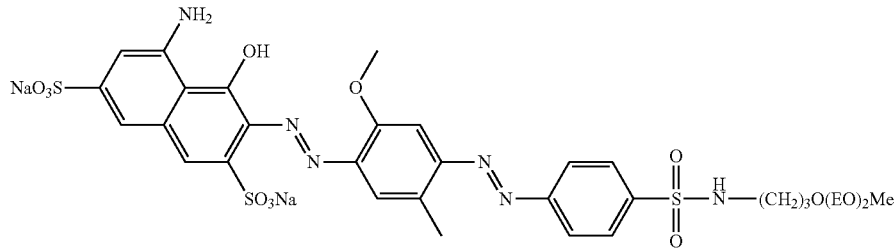
Formula BA6
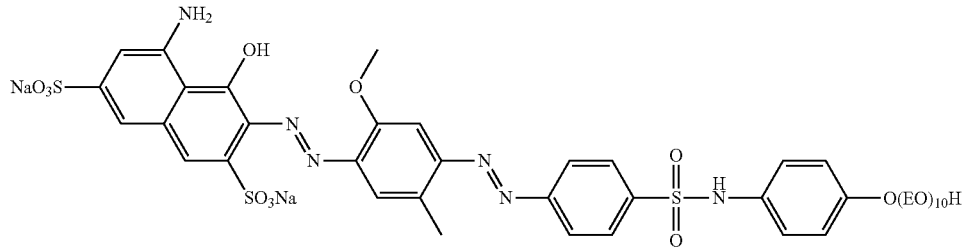
Formula BA7 (Example 19)
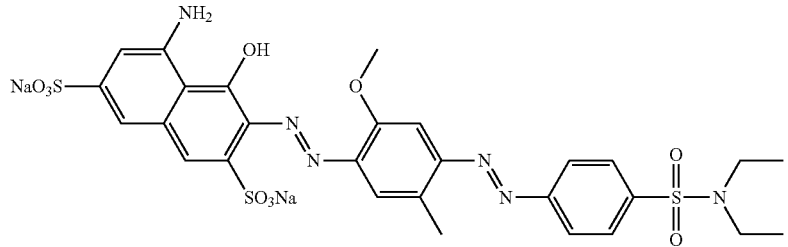
Formula BA8
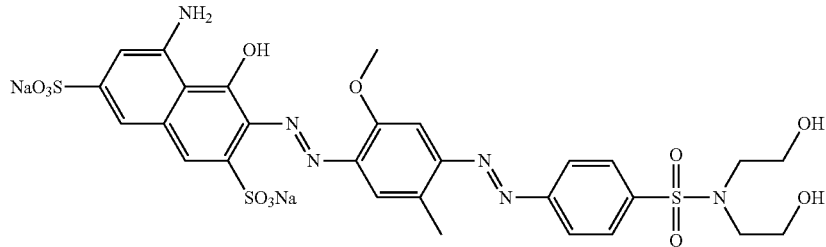

-continued
Formula BA9
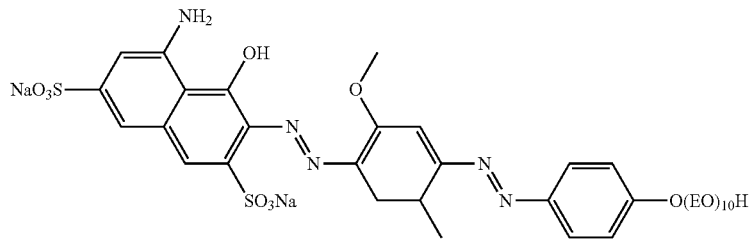
Formula BA10
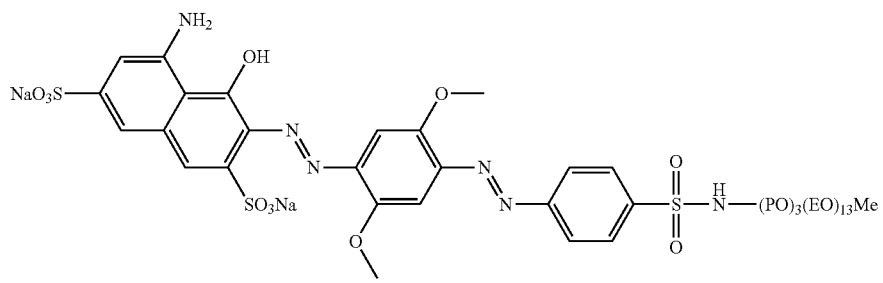
Formula BA11 (Example 10)
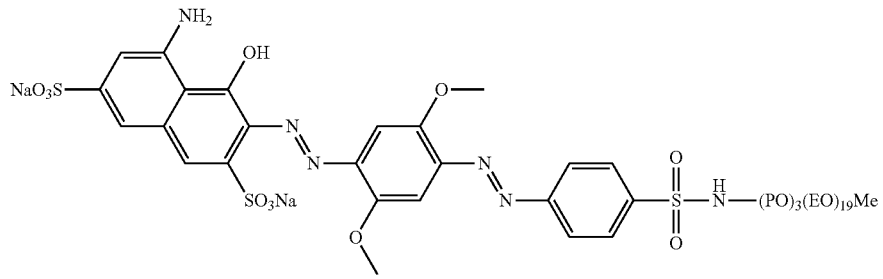
Formula BA12 (Example 8)
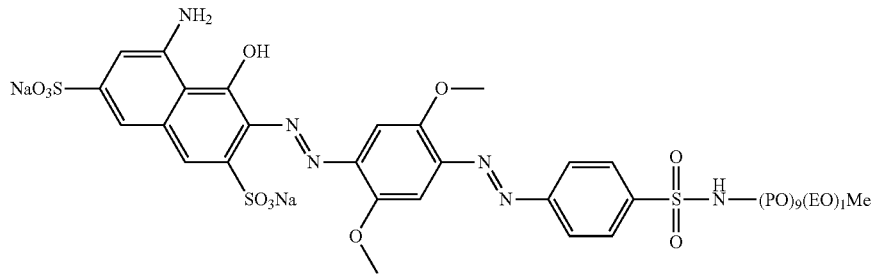
Formula BA13 (Example 2)
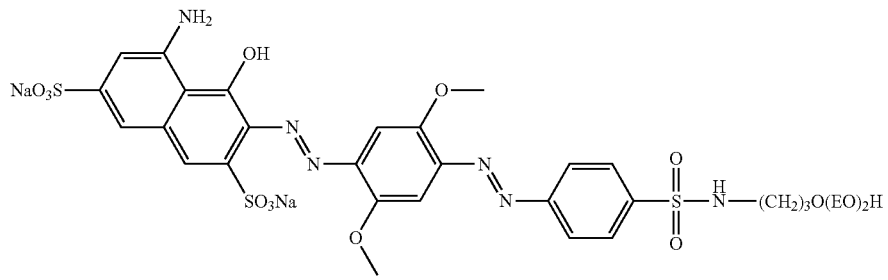
Formula BA14 (Example 7)
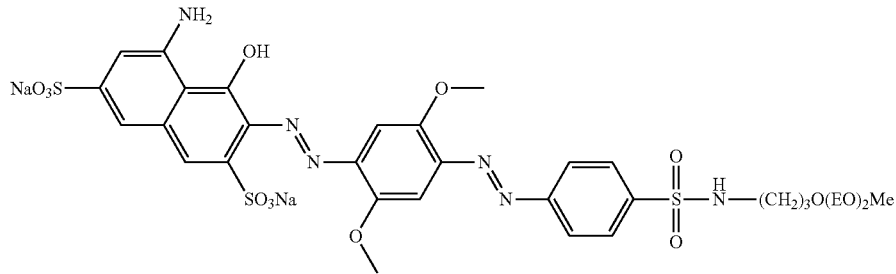

Formula BA15 (Example 12)
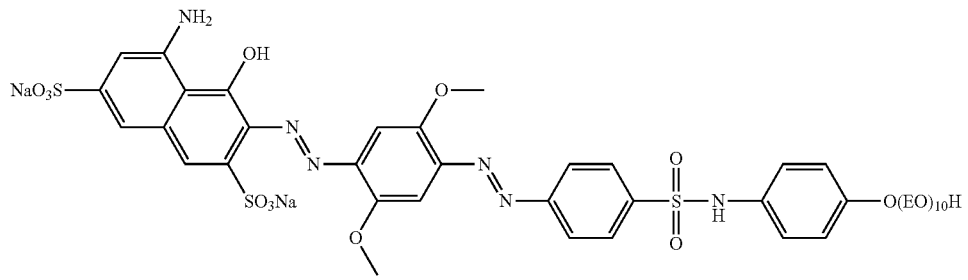
Formula BA16
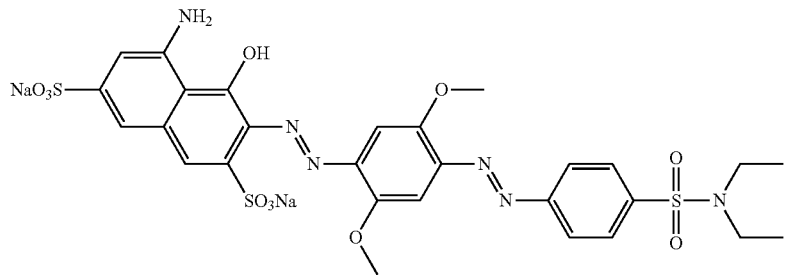
Formula BA17 (Example 13)
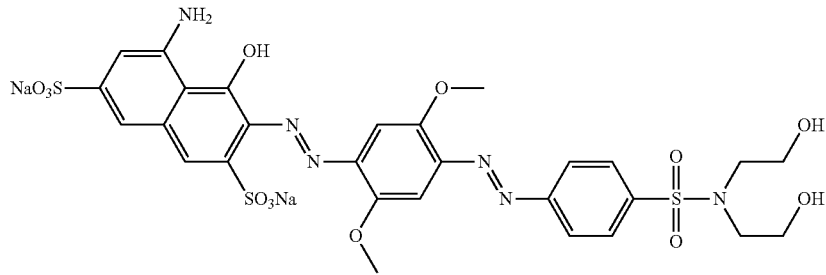
Formula A18 (Example 11)
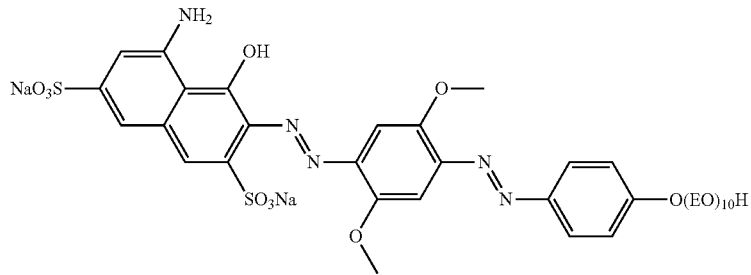
Formula BA19
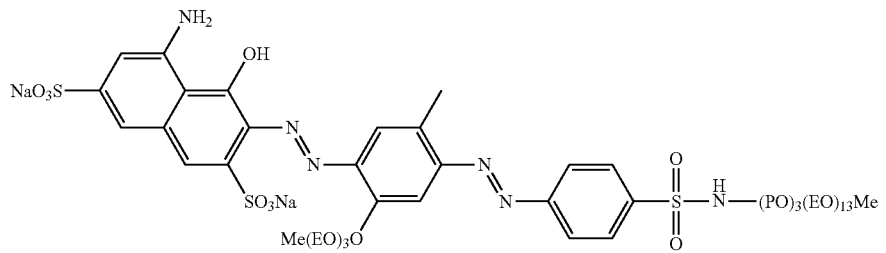

-continued
Formula BA20
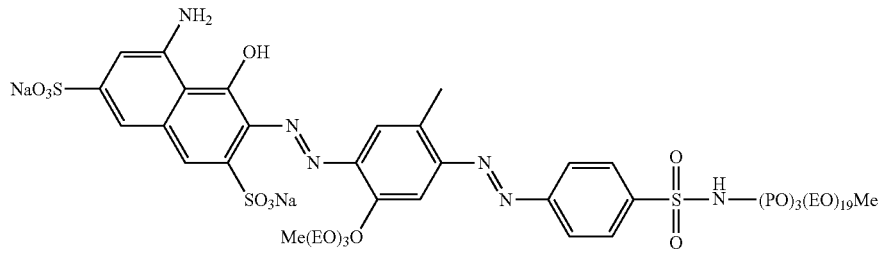
Formula BA21
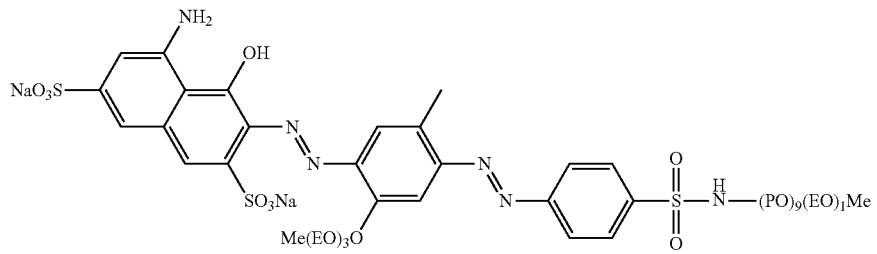
Formula BA22
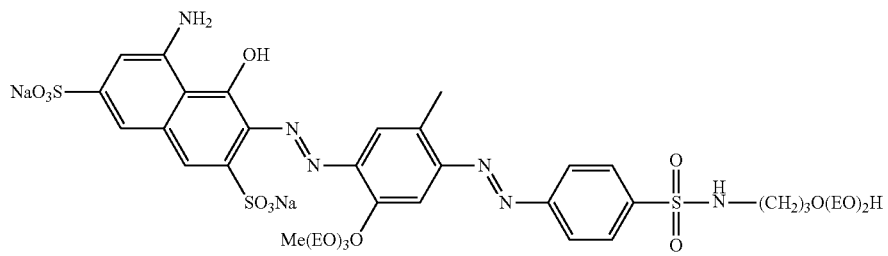
Formula BA23
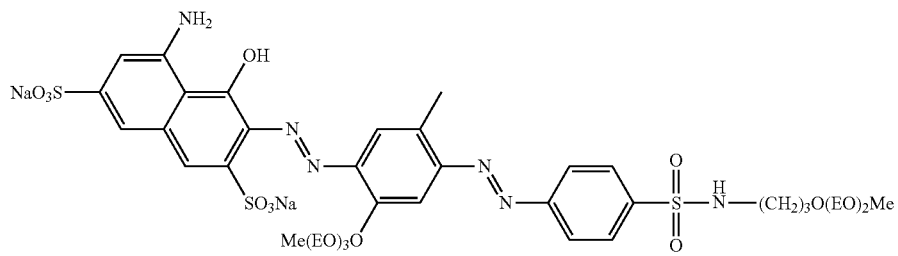
Formula BA24
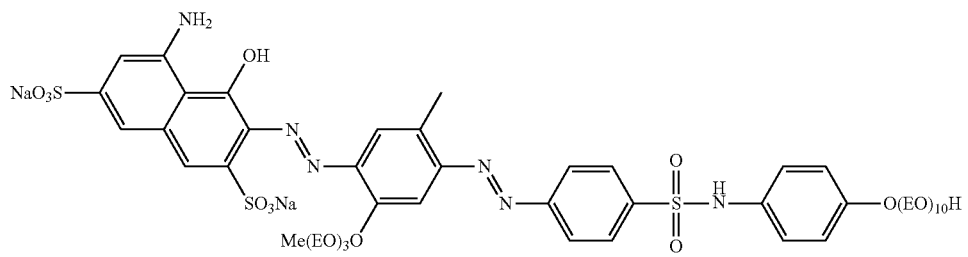
Formula BA25
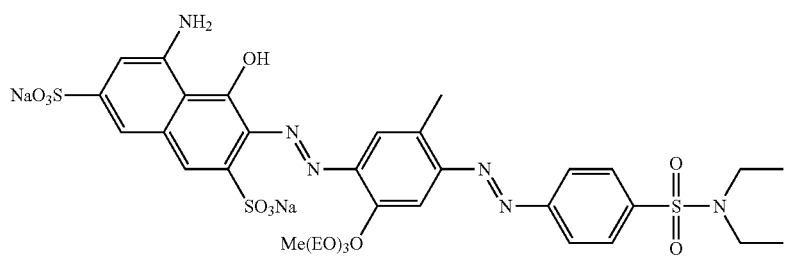

-continued
Formula BA26
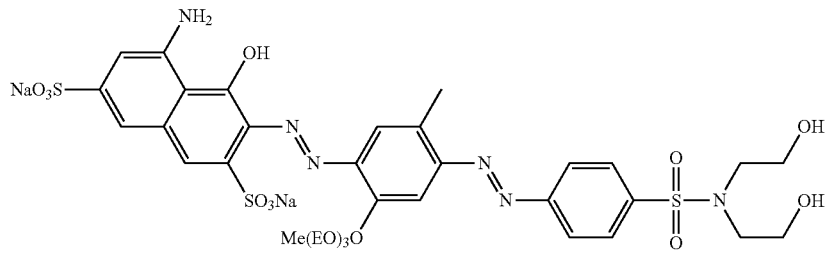
Formula BA27
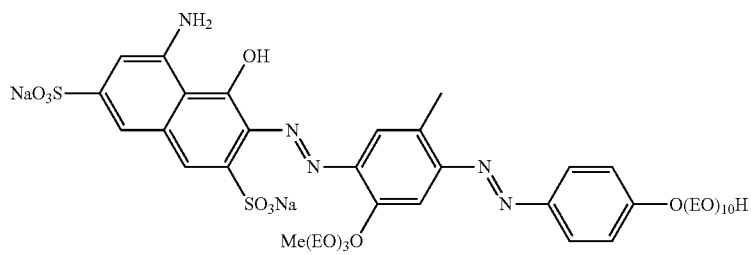
Formula BA28 (Example 15)
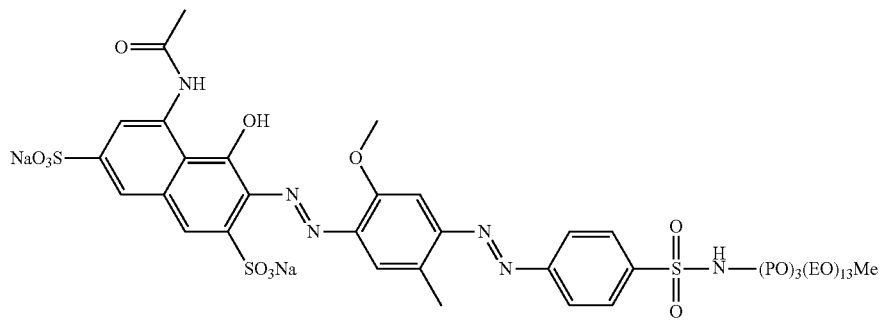
Formula BA29
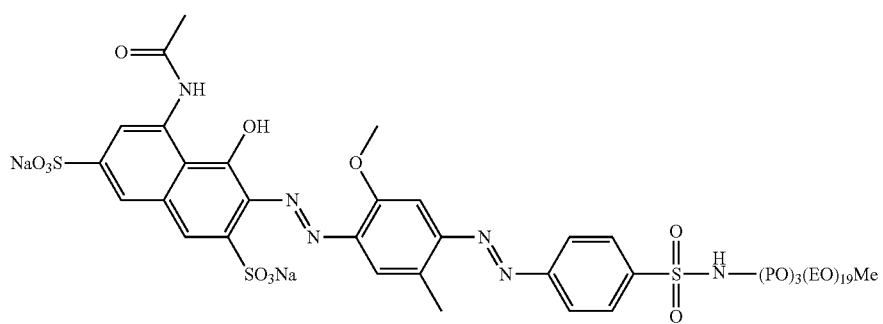
Formula BA30
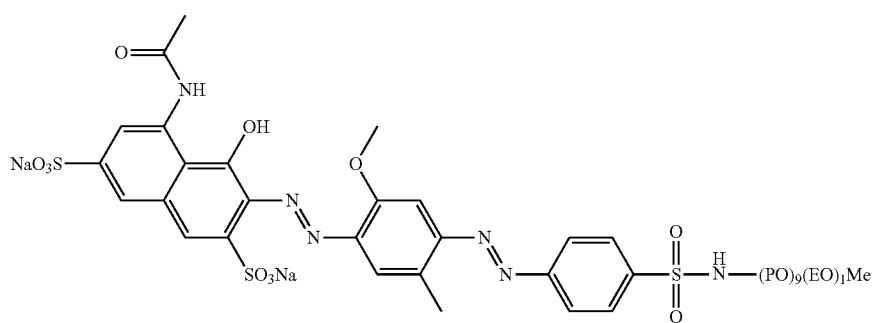

-continued
Formula BA31 (Example 3)
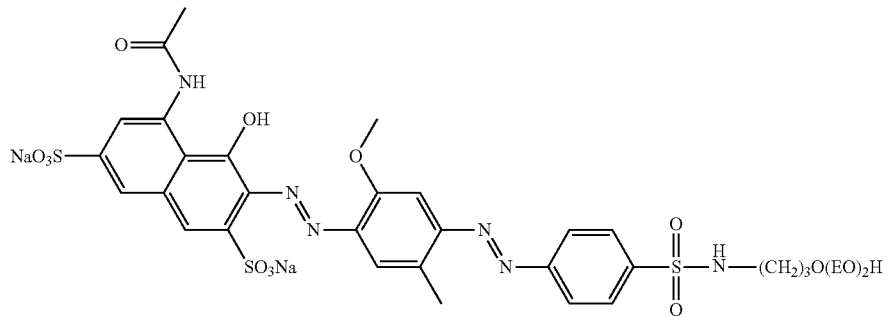
Formula BA32
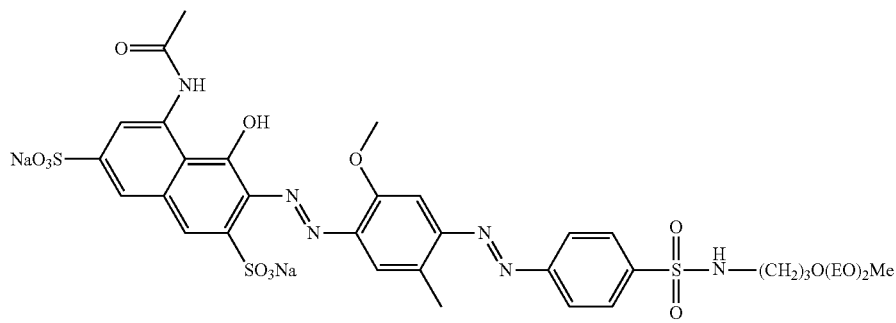
Formula BA33
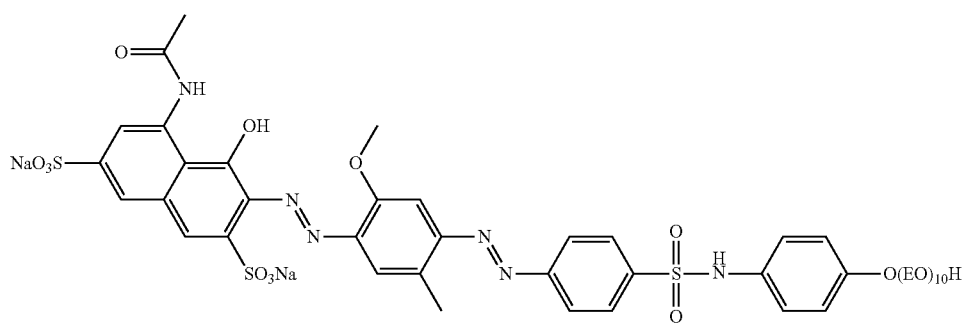
Formula BA34 (Example 17)
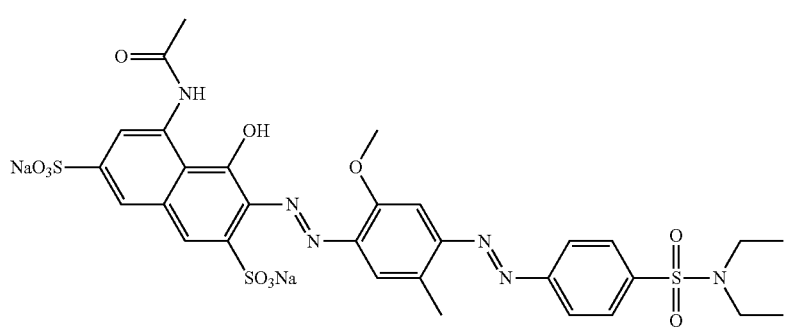
Formula BA35
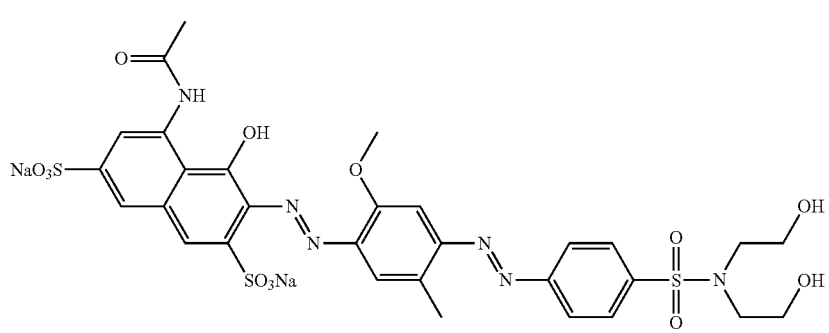

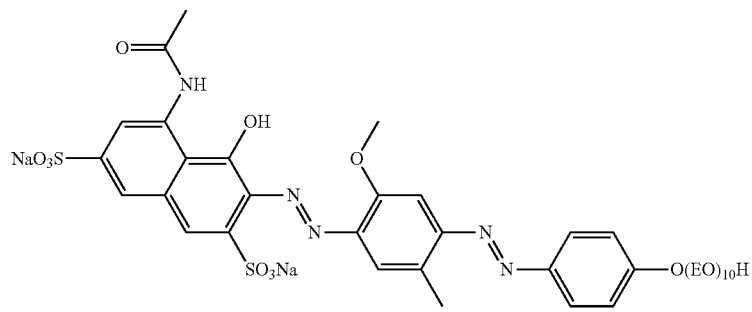
Formula BA36
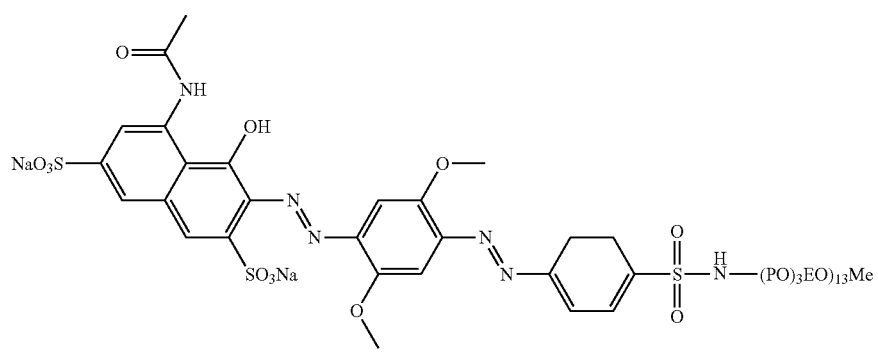
Formula BA37
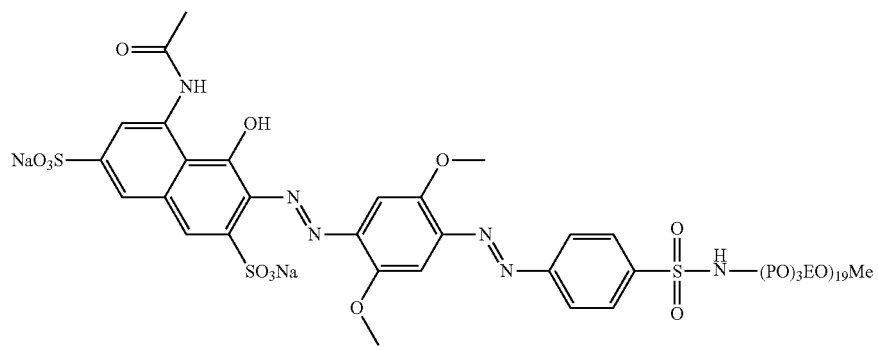
Formula BA38
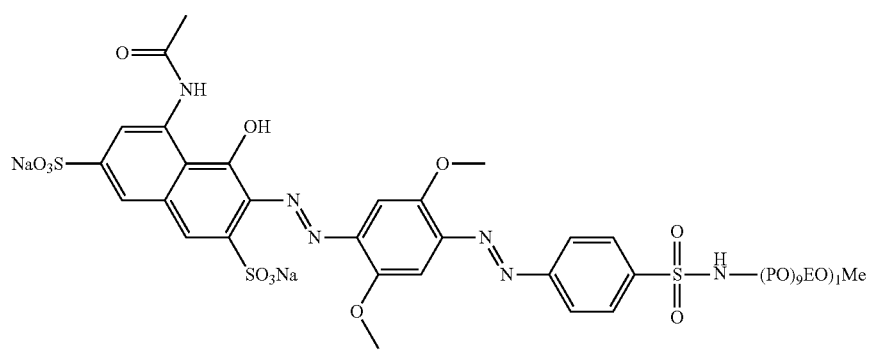
Formula BA39

-continued
Formula BA40
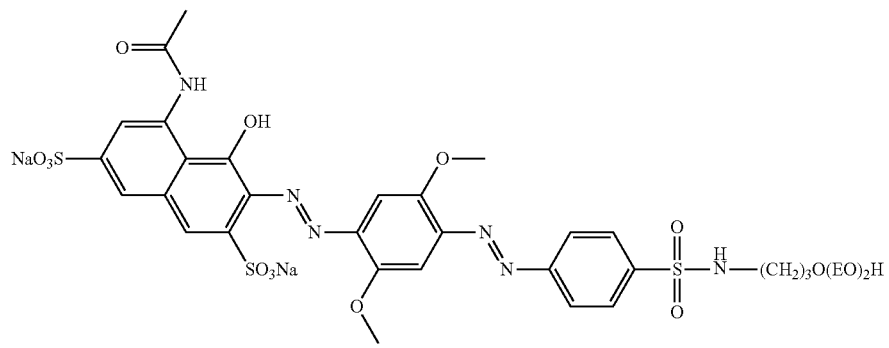
Formula BA41
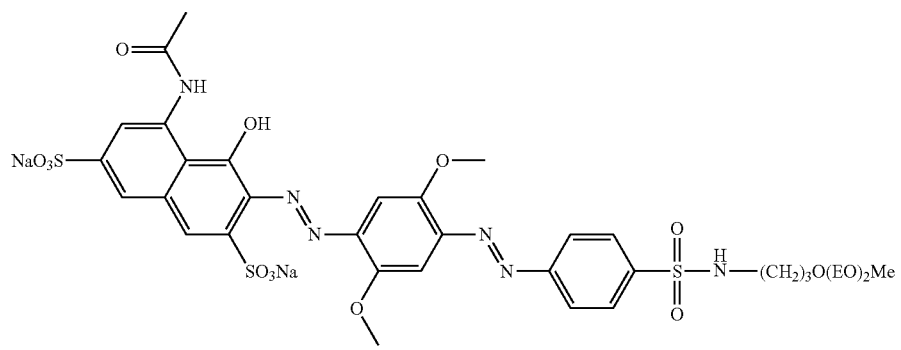
Formula BA42
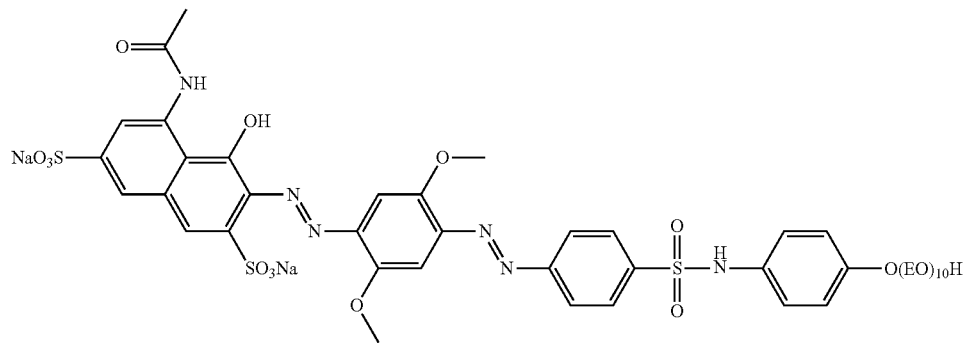
Formula BA43
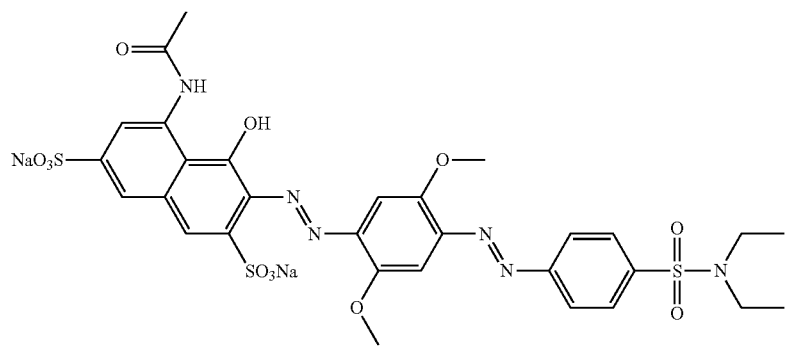

Formula BA44
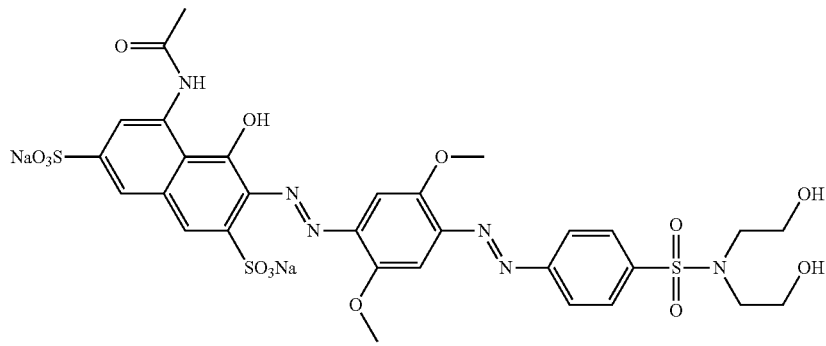
Formula BA45
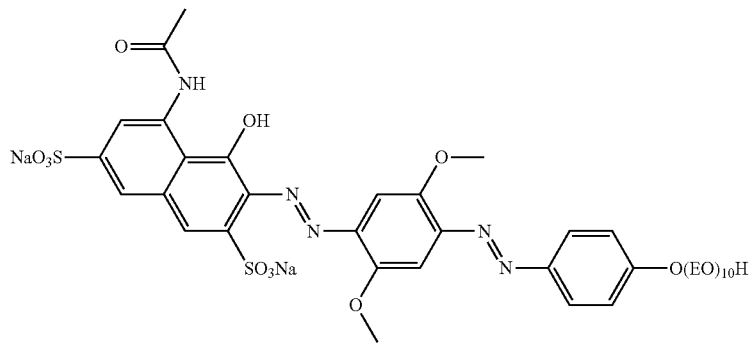
Formula BA46
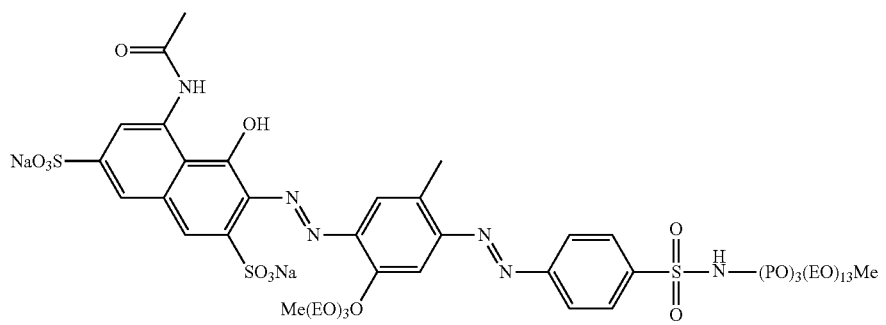
Formula BA47
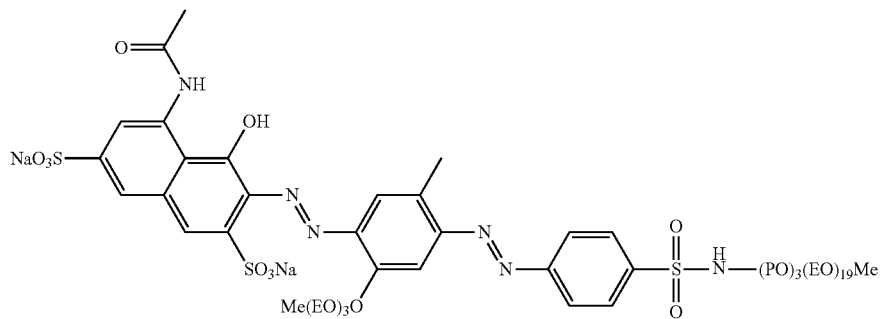

-continued
Formula BA48
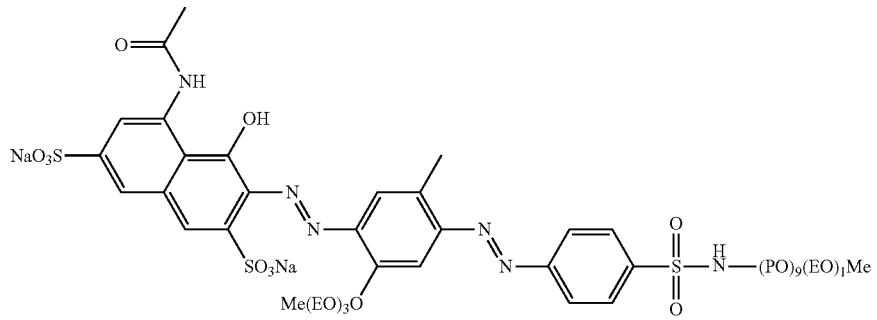
Formula BA49
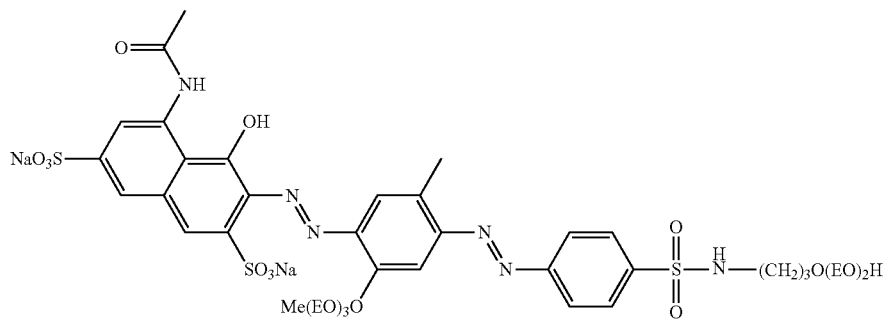
Formula BA50
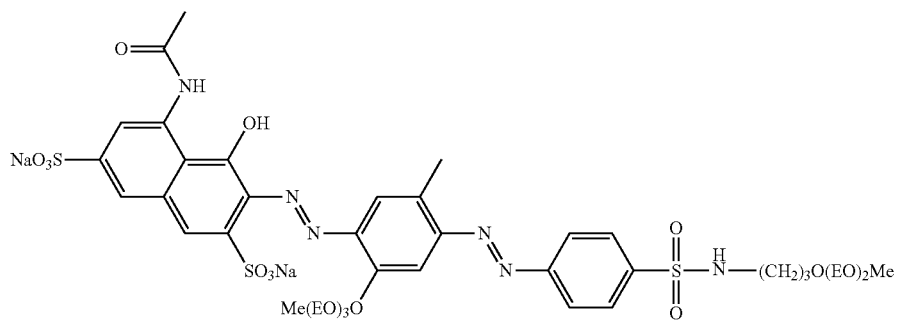
Formula BA51
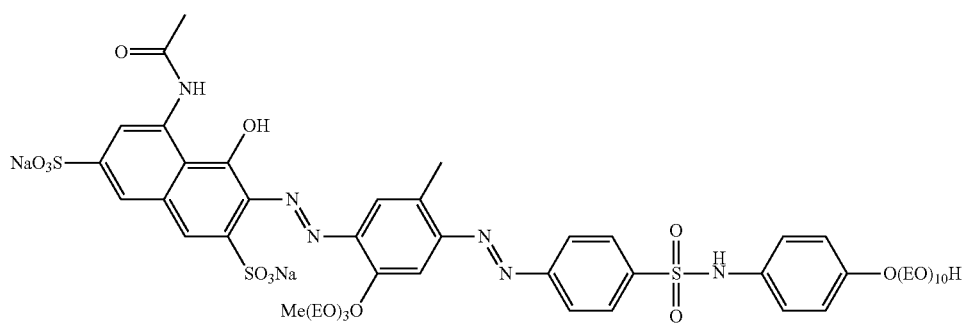
Formula BA52
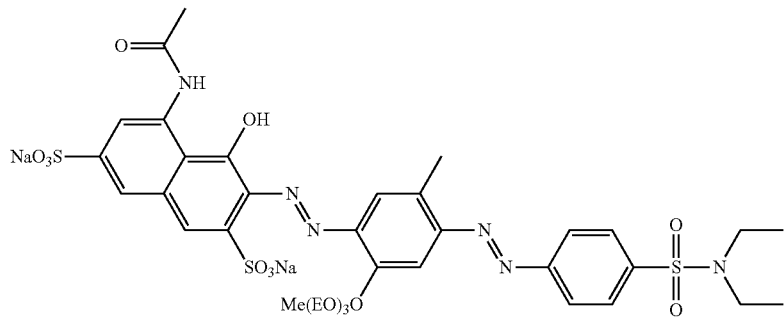

Formula BA53
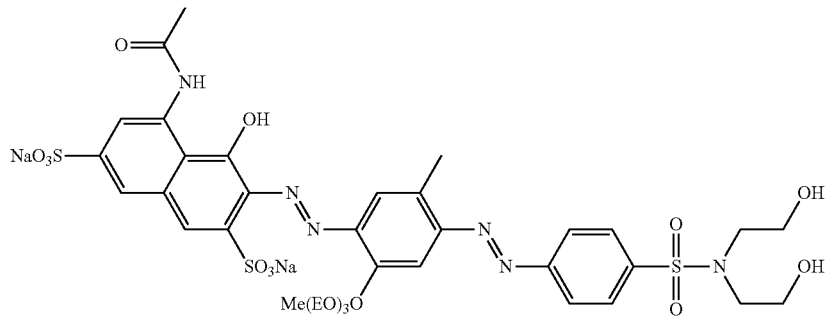
Formula BA54
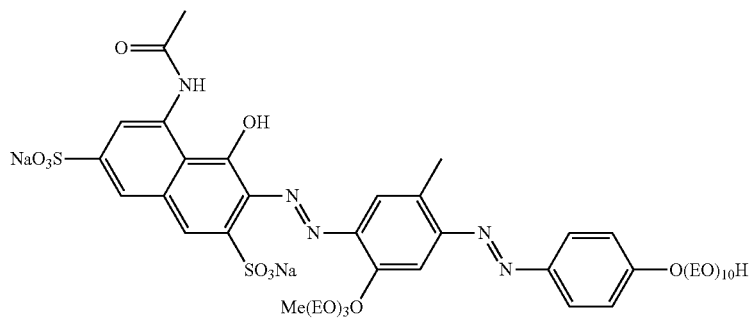
Formula BA55 (Example 16)
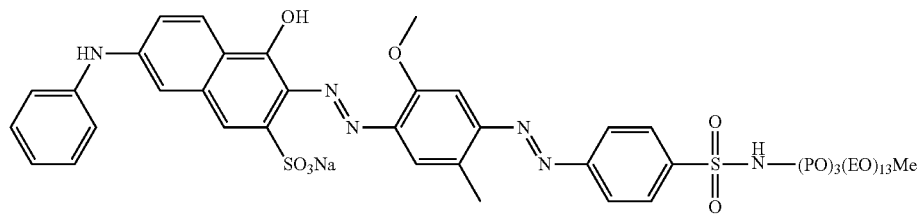
Formula BA56
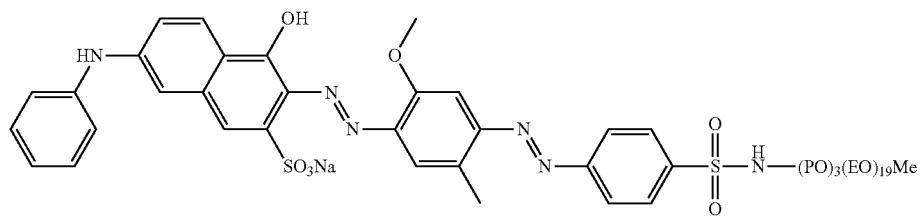
Formula BA57
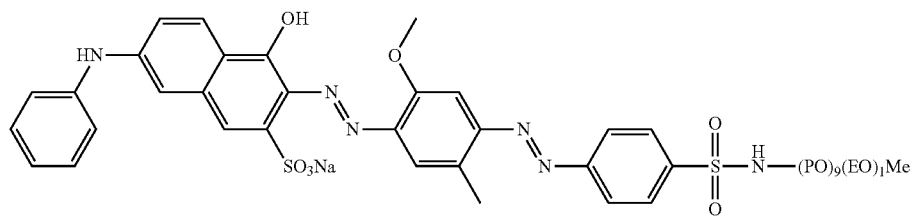
Formula BA58 (Example 4)
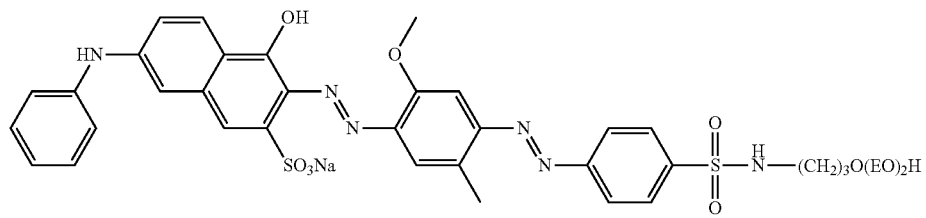

Formula BA59
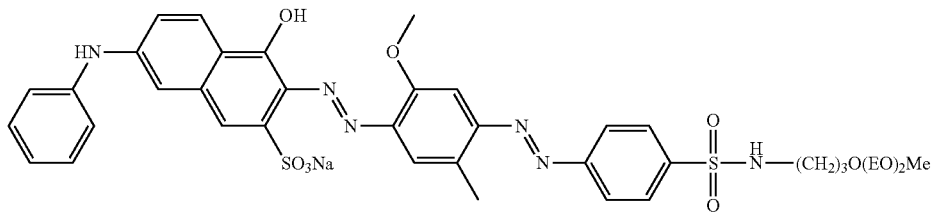
Formula BA60
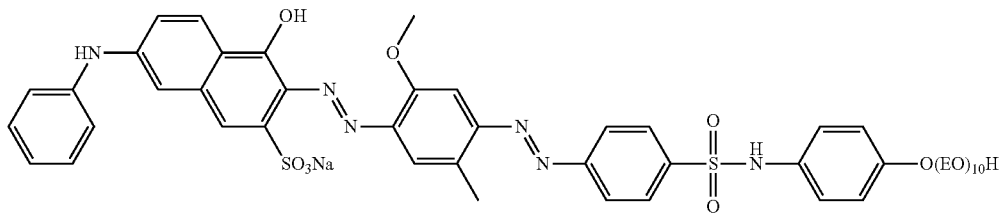
Formula BA61 (Example 18)
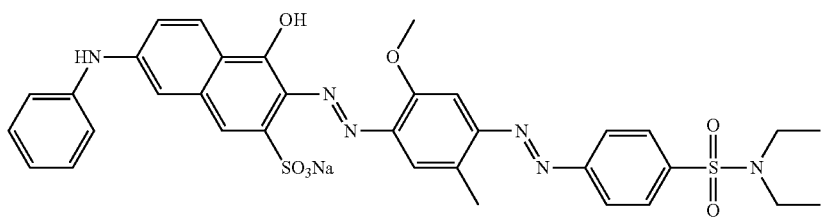
Formula BA62
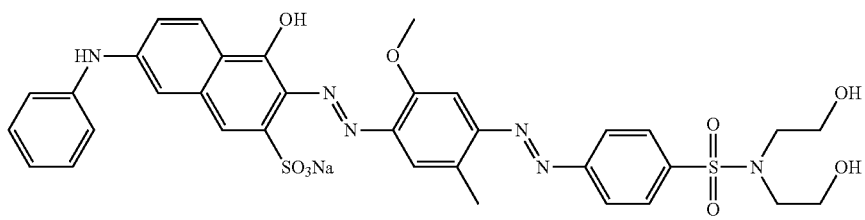
Formula BA63
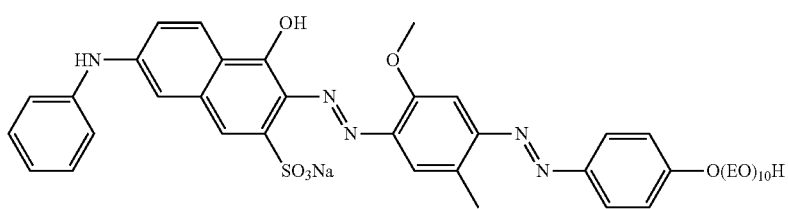
Formula BA64
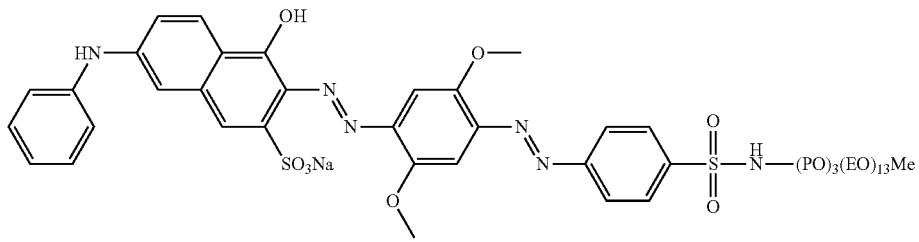
Formula BA65
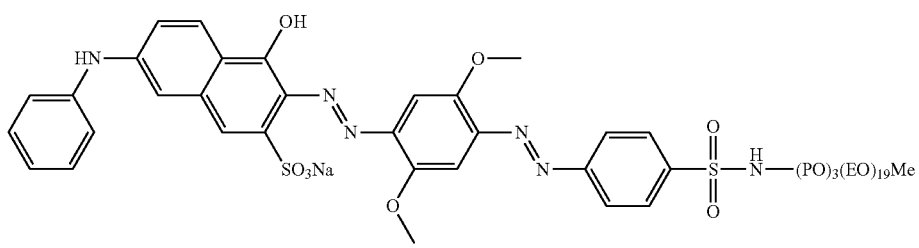

Formula BA66
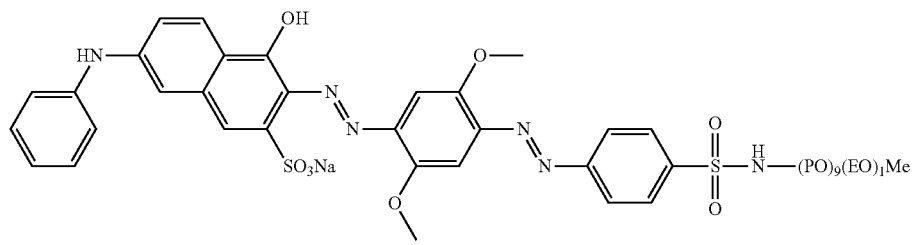
Formula BA67 (Example 5)
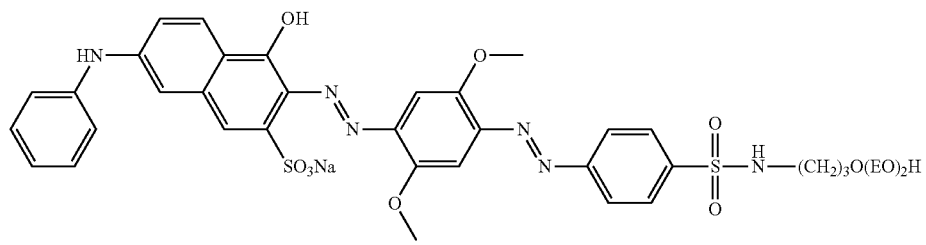
Formula BA68
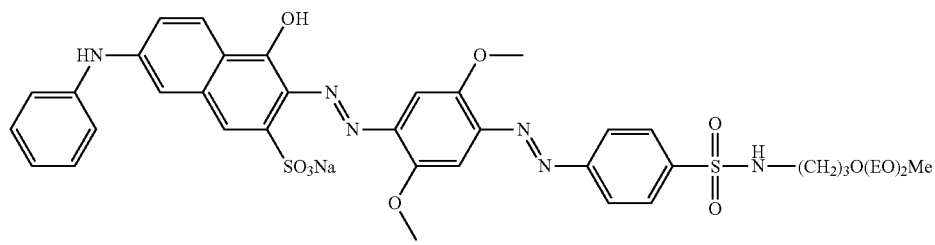
Formula BA69
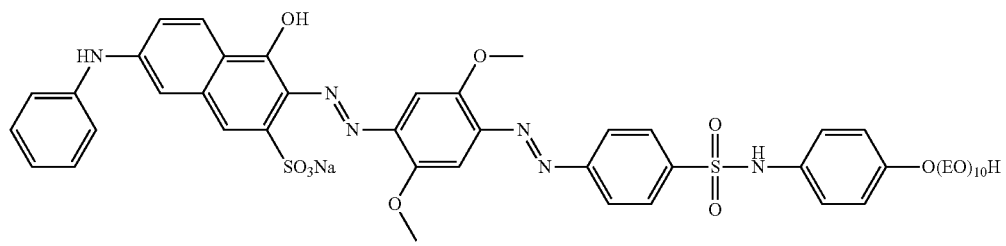
Formula BA70
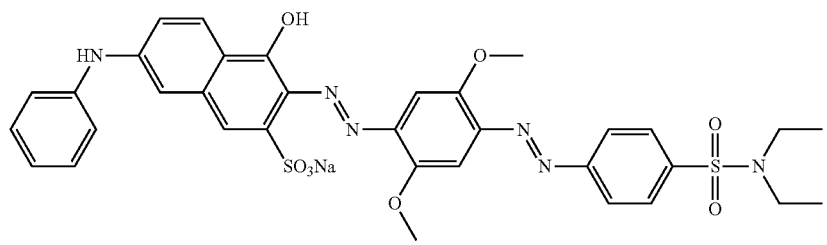
Formula BA71
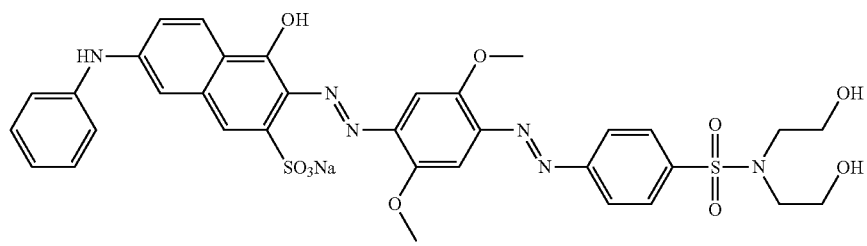

Formula BA72
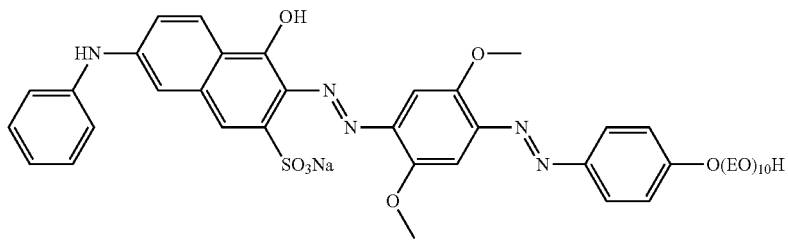
Formula BA73
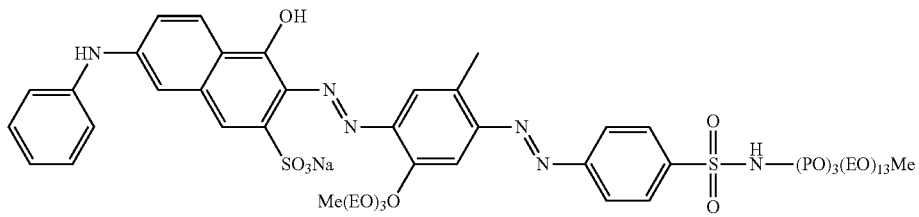
Formula BA74
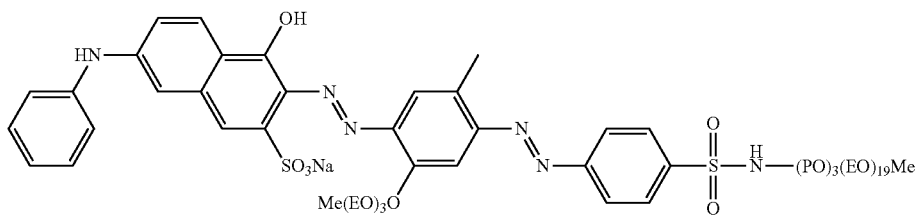
Formula BA75
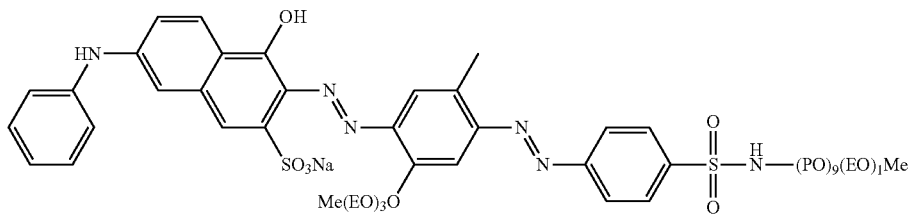
Formula BA76
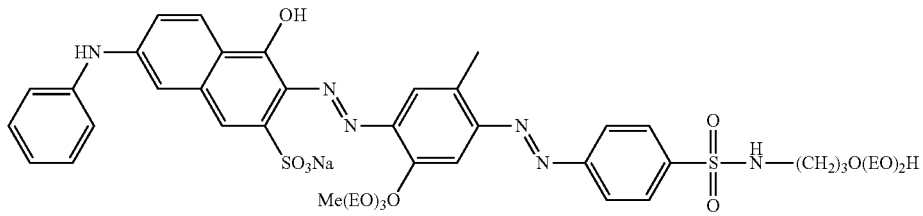
Formula BA77
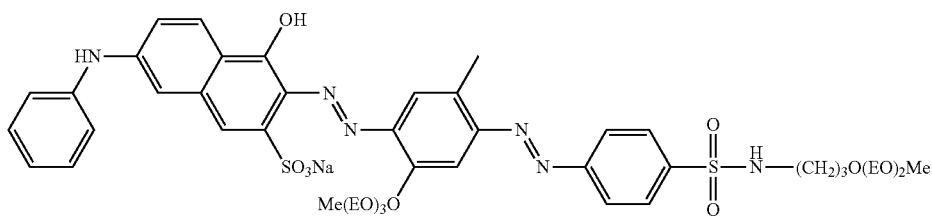
Formula BA78
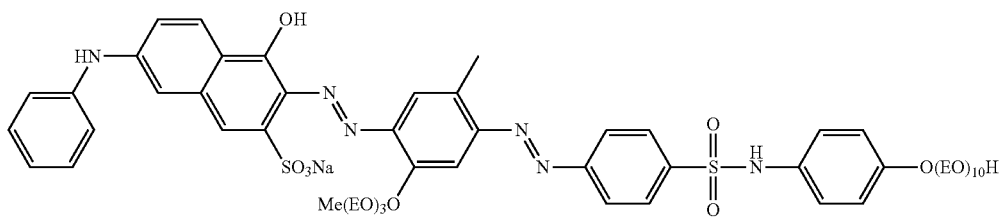

Formula BA79

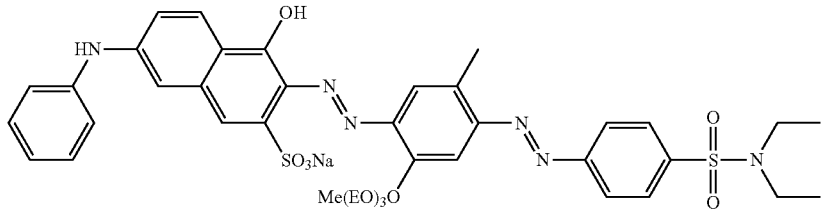

Formula BA80

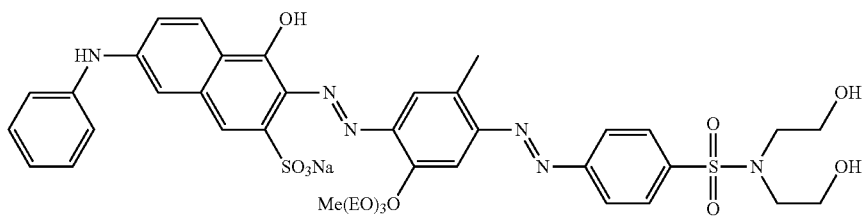

Formula BA81

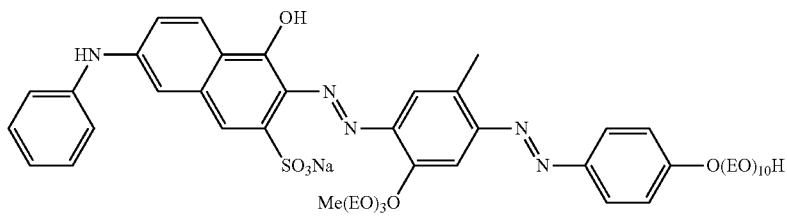

Preferred dyes are selected from the group consisting of BA1, BA2, BA3, BA6, BA10, BA11, BA12, BA15, BA19, BA20, BA21, BA24, BA28, BA29, BA30, BA33, BA37, BA38, BA39, BA42, BA46, BA47, BA48, BA51, BA55, BA56, BA57, BA60, BA64, BA65, BA66, BA69, BA73, BA74, BA75 and BA78. Particularly preferred are BA10, BA20, BA51, BA55, BA56, BA57, BA60, BA66, BA69 and BA78.

The blueing agent also defined herein as the dye, is typically formulated to deposit onto fabrics from the wash liquor to provide a relative hue angle of 220-320° on a consumer relevant garment so as to improve fabric whiteness perception. This hue angle may be generated by the specified blueing agent essential to the invention alone, or by a combination of the essential bluing agent in combination with an additional hueing agent which together generate the desired hue angle. The hueing agent is typically described as blue or violet. It may be suitable that the hueing dye(s) have a peak absorption wavelength of from 550 nm to 650 nm, or from 570 nm to 630 nm. The hueing agent may be a combination of dyes which together have the visual effect on the human eye as a single dye having a peak absorption wavelength on polyester of from 550 nm to 650 nm, or from 570 nm to 630 nm. This may be provided for example by mixing a red and green-blue dye to yield a blue or violet shade.

Dyes are typically coloured organic molecules which are soluble in aqueous media that contain surfactants. Dyes maybe selected from the classes of basic, acid, hydrophobic, direct and polymeric dyes, and dye-conjugates. Suitable polymeric hueing dyes are commercially available, for example from Milliken, Spartanburg, S.C., USA.

Examples of suitable dyes are Liquitint® violet DD, direct violet 7, direct violet 9, direct violet 11, direct violet 26, direct violet 31, direct violet 35, direct violet 40, direct violet 41, direct violet 51, direct violet 66, direct violet 99, acid violet 50, acid blue 9, acid violet 17, acid black 1, acid red 17, acid blue 29, solvent violet 13, disperse violet 27 disperse violet 26, disperse violet 28, disperse violet 63 and disperse violet 77, basic blue 16, basic blue 65, basic blue 66, basic blue 67, basic blue 71, basic blue 159, basic violet 19, basic violet 35, basic violet 38, basic violet 48; basic blue 3, basic blue 75, basic blue 95, basic blue 122, basic blue 124, basic blue 141, thiazolium dyes, reactive blue 19, reactive blue 163, reactive blue 182, reactive blue 96, Liquitint® Violet CT (Milliken, Spartanburg, USA) and Azo-CM-Cellulose (Megazyme, Bray, Republic of Ireland). Other suitable hueing agents are hueing dye-photobleach conjugates, such as the conjugate of sulphonated zinc phthalocyanine with direct violet 99. A particularly suitable hueing agent is a combination of acid red 52 and acid blue 80, or the combination of direct violet 9 and solvent violet 13.

A suitable synthesis route for certain bis-azo colorants disclosed herein is shown below:

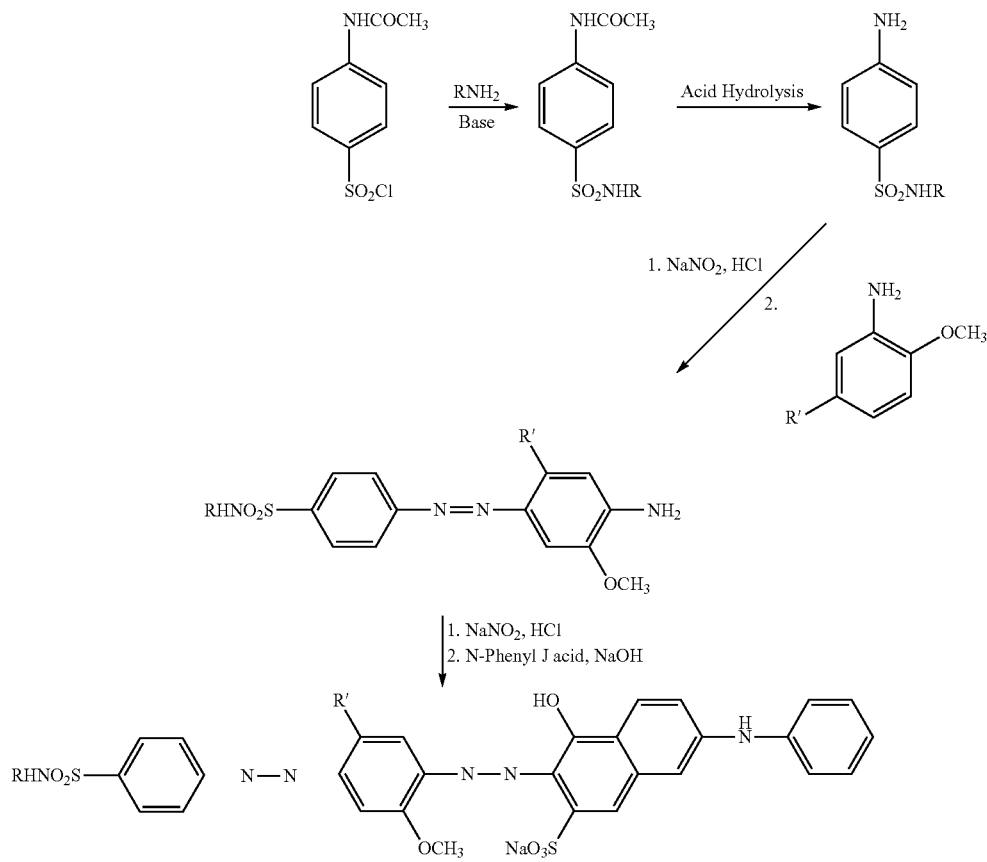

Wherein:
R is selected from the group consisting of alkyl, polyalkyleneoxy, phenyl and substituted phenyl, and
R' is selected from the group consisting of hydrogen, alkyl, or alkoxy.

Other certain bis-azo colorants disclosed herein may be prepared in a similar manner by substituting 2-[2-[2-(2-methoxyethoxy)ethoxy]ethoxy]-5-methylbenzenamine for either 2-methoxy-5-methylbenzenamine or 2,5-dimethoxybenzenamine in the synthesis scheme above.

The base utilized in the first step of the reaction may be selected from sodium carbonate, sodium acetate, sodium hydroxide, or other cationic salts of these respective bases, and tertiary amines.

Acid hydrolysis may be carried out utilizing a strong acid such as hydrochloric acid or sulfuric acid.

Alternatively, the bis-azo colorants disclosed herein may be made according to various procedures known in the art and/or in accordance with the examples of the present invention. For example, coupling may be carried out using polyalkyleneoxy substituted aniline compounds derived by known procedures from starting materials such as 4-methyoxy-2-nitrophenol or 4-methyl-2-nitrophenol, both of which are available from VWR International, LLC (West Chester, Pa., USA).

Laundry Care Compositions

Any of the bluing agents described in the present specification may be incorporated into laundry care compositions including but not limited to laundry detergents and fabric care compositions. The laundry care compositions including laundry detergents may be in solid or liquid form, including a gel form. Such compositions may comprise one or more of said bluing agents and a laundry care ingredient. The bluing agents may be added to substrates using a variety of application techniques. For instance, for application to cellulose-containing textile substrates, the bluing agent may be included as a component of a laundry detergent. Thus, application to a cellulose-containing textile substrate actually occurs when a consumer adds laundry detergent to a washing machine. The bluing agent may be present in the laundry detergent composition in an amount from about 0.0001% to about 10% by weight of the composition, from about 0.0001% to about 5% by weight of the composition, and even from about 0.0001% to about 1% by weight of the composition.

The laundry detergent composition typically comprises a surfactant in an amount sufficient to provide desired cleaning properties. In one aspect, the laundry detergent composition may comprise, based on total laundry detergent composition weight, from about 5% to about 90% of the surfactant, from about 5% to about 70% of the surfactant, or even from about 5% to about 40% of the surfactant. The surfactant may comprise anionic, nonionic, cationic, zwitterionic and/or amphoteric surfactants. In one aspect, the detergent composition comprises anionic surfactant, nonionic surfactant, or mixtures thereof.

Fabric care compositions are typically added in the rinse cycle, which is after the detergent solution has been used and replaced with the rinsing solution in typical laundering processes. The fabric care compositions disclosed herein may be comprise a rinse added fabric softening active and a suitable bluing agent as disclosed in the present specification.

The fabric care composition may comprise, based on total fabric care composition weight, from about 1% to about 90%, or from about 5% to about 50% fabric softening active. The bluing agent may be present in the fabric care composition in an amount from about 0.5 ppb to about 50 ppm, or from about 0.5 ppm to about 30 ppm.

In one aspect, a laundry care composition comprising a laundry care ingredient and a bluing agent comprising:
  (a) at least one chromophore component that comprises a bis-azo colorant, and
  (b) at least one polymeric component or substituted sulfonamide component;
wherein the bluing agent has the following structure:

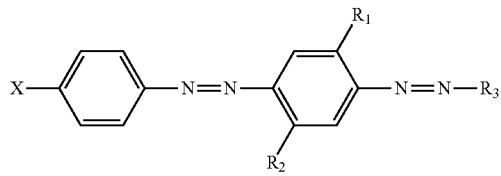

wherein:
$R_1$ and $R_2$ are independently H, alkyl, alkoxy, alkyleneoxy, alkyl capped alkyleneoxy, polyalkyleneoxy, alkyl capped polyalkyleneoxy, urea, or amido;
$R_3$ is an aryl group substituent that may be a substituted phenyl or napthyl moiety;
X is a substituted oxygen, a substituted or unsubstituted amino, or a substituted or unsubstituted sulfonamide group wherein the substituents are selected from the group consisting of alkyl, alkyleneoxy, polyalkyleneoxy, or phenyl moieties wherein the phenyl group may be further substituted with alkyl, alkyleneoxy or polyalkyleneoxy moieties is disclosed.

In one aspect, said bluing agent comprises a polyoxyalkylene chain having from 2 to about 30 repeating units.

In one aspect, said bluing agent comprises a polyoxyalkylene chain having from 2 to about 20 repeating units.

In one aspect, said bluing agent comprises a polyoxyalkylene chain having from 2 to about 10 repeating units.

In one aspect, bluing agent comprises a polyoxyalkylene chain having from about 4 to about 6 repeating units.

In one aspect, bluing agent comprises an alkoxylated bis-azo polymeric colorant.

In one aspect, bluing agent's chromophore exhibits an absorbance spectrum maximum in water of from about 520 nanometers to about 640 nanometers.

In one aspect, said bluing agent's chromophore exhibits an absorbance spectrum maximum in water of from about 560 nanometers to about 610 nanometers.

In one aspect, said bluing agent exhibits an absolute hue angle in the range of 265° to 310°.

In aspect said, bluing agent exhibits an absolute hue angle in the range of 273° to 287°.

In one aspect, said bluing agent has the following structure:

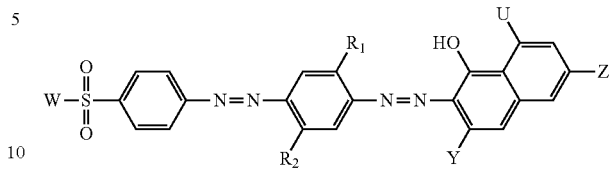

wherein:
$R_1$ and $R_2$ are independently H, alkyl, alkoxy, alkyleneoxy, alkyl capped alkyleneoxy, polyalkyleneoxy, alkyl capped polyalkyleneoxy, or amino;
W is a substituted amino moiety;
U is a hydrogen, an amino group or an amino group substituted with an acyl group;
Y is a hydrogen or a sulfonic acid moiety; and
Z is a sulfonic acid moiety or an amino group substituted with a phenyl group.

In one aspect, of said bluing agent, $R_1$ is alkoxy and $R_2$ is alkyl.

Suitable Laundry Care Ingredients

While not essential for the purposes of the present invention, the non-limiting list of laundry care ingredients illustrated hereinafter are suitable for use in the laundry care compositions and may be desirably incorporated in certain aspects of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular aspect. The total amount of such adjuncts may range, once the amount of dye is taken into consideration from about 90% to about 99.99999995% by weight of the laundry care composition.

The precise nature of these additional components, and levels of incorporation thereof, will depend on the physical form of the composition and the nature of the operation for which it is to be used. Suitable laundry care ingredients include, but are not limited to, fabric softening actives, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain aspects of Applicants' compositions do not contain one or more of the following adjuncts materials: fabric softening actives, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments.

However, when one or more adjuncts are present, such one or more adjuncts may be present as detailed below:

Surfactants

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, or $C_{11}$-$C_{14}$ alkyl benzene sulfonic acids. In one aspect, the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially useful are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl etromher sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about from 0.5 to 20, or from 1 to 20, and M is a salt-forming cation. In one aspect, R' is $C_{10}$-$C_{18}$ alkyl, n is from about 1 to 15, and M is sodium, potassium, ammonium, alkylammonium, or alkanolammonium. In one aspect, R' is a $C_{12}$-$C_{16}$, n is from about 0.5 to 6, or from 1 to 6 and M is sodium.

The alkyl ether sulfates will generally be used in the form of mixtures comprising varying R' chain lengths and varying degrees of ethoxylation. Frequently such mixtures will inevitably also contain some non ethoxylated alkyl aulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In one aspect, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS), including predominantly $C_{12}$ alkyl sulfates; c) $C_{10}$-$C_{18}$ secondary (2,3) alkyl sulfates having formulae (I) and (II): wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of suitable cations including sodium, potassium, ammonium, and mixtures thereof, and x is an integer of at least about 7, or at least about 9, and y is an integer of at least 8, or at least about 9; d) $C_{10}$-$C_{18}$ alkyl alkoxy sulfates ($AE_xS$) wherein x is from 1-30; e) $C_{10}$-$C_{18}$ alkyl alkoxy carboxylates in one aspect, comprising 1-5 ethoxy units; f) mid-chain branched alkyl sulfates as discussed in U.S. Pat. Nos. 6,020,303 and 6,060,443; g) mid-chain branched alkyl alkoxy sulfates as discussed in U.S. Pat. Nos. 6,008,181 and 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

A suitable anionic detersive surfactant is predominantly alkyl $C_{16}$ alkyl mid-chain branched sulphate. A suitable feedstock for predominantly alkyl $C_{16}$ alkyl mid-chain branched sulphate is beta-farnesene, such as BioFene™ supplied by Amyris, Emeryville, Calif.

Suitable nonionic surfactants useful herein can comprise any of the conventional nonionic surfactant types typically used in liquid detergent products. These include alkoxylated fatty primary alcohol-based or secondary alcohol-based surfactants and amine oxide surfactants. In one aspect, for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain from about 2 to 12 ethylene oxide moieties per molecule, or from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17 from about 6 to 15, or from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2.qH_2O$. In this formula, R is a relatively long-chain hydrocarbyl moiety which can be saturated or unsaturated, linear or branched, and can contain from 8 to 20, 10 to 16 carbon atoms, or is a $C_{12}$-$C_{16}$ primary alkyl. R' is a short-chain moiety, in one aspect R' may be selected from hydrogen, methyl and —$CH_2OH$. When x+y+z is different from 0, EO is ethyleneoxy, PO is propyleneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x if from 1-30, as discussed in U.S. Pat. Nos. 6,153,577, 6,020,303 and 6,093,856; f) Alkylpolysaccharides as discussed in U.S. Pat. No. 4,565,647 to Llenado, issued Jan. 26, 1986; specifically alkylpolyglycosides as discussed in U.S. Pat. Nos. 4,483,780 and 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (in one aspect $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, or $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

Aqueous, Non-Surface Active Liquid Carrier

As noted, the laundry care compositions may be in the form of a solid, either in tablet or particulate form, including, but not limited to particles, flakes, sheets, or the like, or the compositions may be in the form of a liquid. The liquid detergent compositions may comprise an aqueous, non-surface active liquid carrier. Generally, the amount of the aqueous, non-surface active liquid carrier employed in the compositions herein will be effective to solubilize, suspend or disperse the composition components. For example, the liquid detergent compositions may comprise, based on total liquid detergent composition weight, from about 5% to about 90%, from about 10% to about 70%, or from about 20% to about 70% of the aqueous, non-surface active liquid carrier.

The most cost effective type of aqueous, non-surface active liquid carrier is typically water. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids typically is minimized to hold down composition cost. Accordingly, the aqueous liquid carrier component of the liquid detergent products herein will generally comprise water present in concentrations ranging from about 5% to about 90%, or from about 5% to about 70%, by weight of the liquid detergent composition.

The liquid compositions may be structured as described in EP-A-1328616 or EP-A-1396536.

Bleaching Agents

Bleaching Agents—The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) photobleaches for example sulfonated zinc phtlialocyanine;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C═O)O—O—M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C═O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Boosting Compounds—The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

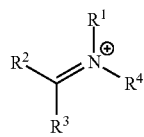

[I]

where $R^1$-$R^4$ may be a hydrogen or an unsubstituted or substituted radical selected from the group consisting of phenyl, aryl, heterocyclic ring, alkyl and cycloalkyl radicals.

Suitable bleach boosting compounds include zwitterionic bleach boosters zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

The composition may comprise metal bleach catalyst, typically comprising copper, iron, titanium, ruthenium, tungsten, molybdenum, and/or manganese cations. Suitable transition metal bleach catalysts include iron-based or manganese-based transition metal bleach catalysts, preferably manganese-based transition metal bleach catalysts.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are typically employed in conjunction with a peroxygen source in the bleaching systems of the present invention.

A suitable source of available oxygen (AvOx) is a source of hydrogen peroxide, such as percarbonate salts and/or perborate salts, such as sodium percarbonate. The source of peroxygen may be at least partially coated, or even completely coated, by a coating ingredient such as a carbonate salt, a sulphate salt, a silicate salt, borosilicate, or any mixture thereof, including mixed salts thereof. Suitable percarbonate salts can be prepared by a fluid bed process or by a crystallization process. Suitable perborate salts include sodium perborate mono-hydrate (PB1), sodium perborate tetra-hydrate (PB4), and anhydrous sodium perborate which is also known as fizzing sodium perborate. Other suitable sources of AvOx include persulphate, such as oxone. Another suitable source of AvOx is hydrogen peroxide.

The composition may comprise a reducing bleach. However, the composition may be substantially free of reducing bleach; substantially free means "no deliberately added". Suitable reducing bleach include sodium sulphite and/or thiourea dioxide (TDO).

The composition may comprise a co-bleach particle. Typically, the co-bleach particle comprises a bleach activator and a source of peroxide. It may be highly suitable for a large amount of bleach activator relative to the source of hydrogen peroxide to be present in the co-bleach particle. The weight ratio of bleach activator to source of hydrogen peroxide present in the co-bleach particle can be at least 0.3:1, or at least 0.6:1, or at least 0.7:1, or at least 0.8:1, or at least 0.9:1, or at least 1.0:1.0, or even at least 1.2:1 or higher. The co-bleach particle can comprise: (i) bleach activator, such as TAFD; and (ii) a source of hydrogen pernxide, such as sodium percarbonate. The bleach activator may at least partially, or even completely, enclose the source of hydrogen peroxide. The co-bleach particle may comprise a binder. Suitable binders are carboxylate polymers such as polyacrylate polymers, and/or surfactants including nonionic detersive surfactants and/or anionic detersive surfactants such as linear $C_{11}$-$C_{13}$ alkyl benzene sulphonate. The co-bleach particle may comprise bleach catalyst, such as an oxaziridium-based bleach catalyst.

Brightener-Suitable brighteners are stilbenes, such as brightener 15. Other suitable brighteners are hydrophobic brighteners, and brightener 49. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

The composition preferably comprises brightener, preferably C.I. fluorescent brightener 260. The brightener preferably has the following structure:

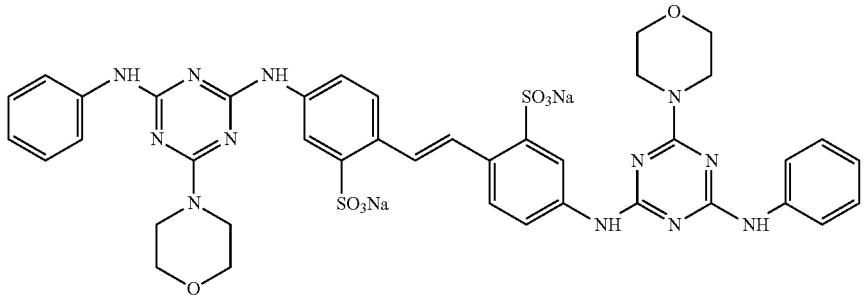

The C.I. fluorescent brightener 260 is preferably predominantly in alpha-crystalline form. Predominantly in alpha-crystalline form means that preferably at least 50 wt %, or at least 75 wt %, or even at least 90 wt %, or at least 99 wt %, or even substantially all, of the C.I. fluorescent brightener 260 is in alpha-crystalline form.

The C.I. fluorescent brightener 260 brightener may be in micronized particulate form, typically having a weight average primary particle size of from 3 to 30 micrometers, preferably from 3 micrometers to 20 micrometers, and most preferably from 3 to 10 micrometers; this is particularly preferred when the C.I. fluorescent brightener 260 brightener is predominantly in beta-crystalline form. Predominantly in beta-crystalline form means that preferably at least 50 wt %, or at least 75 wt %, or even at least 90 wt %, or at least 99 wt %, or even substantially all, of the C.I. fluorescent brightener 260 is in beta-crystalline form.

Enzyme Bleaching-Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m$^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

In one aspect, the fabric softening active ("FSA") is a quaternary ammonium compound suitable for softening fabric in a rinse step. In one aspect, the FSA is formed from a reaction product of a fatty acid and an aminoalcohol obtaining mixtures of mono-, di-, and, in one aspect, triester compounds. In another aspect, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain aspects of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

$$\{R_{4-m}-N^+-[(CH_2)_n-Y-R^1]_m\}X^-$$

wherein each R substituent is either hydrogen, a short chain $C_1$-$C_6$, for example $C_1$-$C_3$ alkyl or hydroxyalkyl group, e.g., methyl, ethyl, propyl, hydroxyethyl, and the like, poly ($C_{2-3}$ alkoxy), for example, polyethoxy, group, benzyl, or mixtures thereof; each m is 2 or 3; each n is from 1 to about 4, or 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, or $C_{14}$-$C_{20}$, with each $R^1$ being a hydrocarbyl, or substituted hydrocarbyl group; it is acceptable for $R^1$ to be unsaturated or saturated and branched or linear and in one aspect it is linear; it is acceptable for each $R^1$ to be the same or different and typically these are the same; and $X^-$ can be any softener-compatible anion, suitable anions include, chloride, bromide, methylsulfate, ethylsulfate, sulfate, phosphate, and nitrate, in one aspect the anions are chloride or methyl sulfate. Suitable DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardened tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one aspect, the FSA comprises other actives in addition to DQA (1) or DQA. In yet another aspect, the FSA comprises only DQA (1) or DQA and is free or essentially free of any other quaternary ammonium compounds or other actives. In yet another aspect, the FSA comprises the precursor amine that is used to produce the DQA.

In another aspect of the invention, the FSA comprises a compound, identified as DTTMAC comprising the formula:

$$[R_{4-m}-N^{(+)}-R^1_m]A^-$$

wherein each m is 2 or 3, each $R^1$ is a $C_6$-$C_{22}$, or $C_{14}$-$C_{20}$, but no more than one being less than about $C_{12}$ and then the other is at least about 16, hydrocarbyl, or substituted hydrocarbyl substituent, for example, $C_{10}$-$C_{20}$ alkyl or alkenyl (unsaturated alkyl, including polyunsaturated alkyl, also referred to sometimes as "alkylene"), in one aspect $C_{12}$-$C_{18}$ alkyl or alkenyl, and branch or unbranched. In one aspect, the Iodine Value (IV) of the FSA is from about 1 to 70; each R is H or a short chain $C_1$-$C_6$, or $C_1$-$C_3$ alkyl or hydroxyalkyl group, e.g., methyl, ethyl, propyl, hydroxyethyl, and the like, benzyl, or $(R^2O)_{2-4}H$ where each $R^2$ is a $C_{1-6}$ alkylene group; and $A^-$ is a softener compatible anion, suitable anions include chloride, bromide, methylsulfate, ethylsulfate, sulfate, phosphate, or nitrate; in one aspect the anions are chloride or methyl sulfate.

Examples of these FSAs include dialkydimethylammonium salts and dialkylenedimethylammonium salts such as ditallowdimethylammonium and ditallowdimethylammonium methylsulfate. Examples of commercially available dialkylenedimethylammonium salts usable in the present invention are di-hydrogenated tallow dimethyl ammonium chloride and ditallowdimethyl ammonium chloride available from Degussa under the trade names Adogen® 442 and Adogen® 470 respectively. In one aspect, the FSA comprises other actives in addition to DTTMAC. In yet another aspect, the FSA comprises only compounds of the DTTMAC and is free or essentially free of any other quaternary ammonium compounds or other actives.

In one aspect, the FSA comprises an FSA described in U.S. Pat. Pub. No. 2004/0204337 A1, published Oct. 14, 2004 to Corona et al., from paragraphs 30-79. In another aspect, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one aspect, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one aspect, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(atearoylamino)propyl]N [2 (atearoyloxy)ethoxy)ethyl)] N methylamine.

Another aspect of the invention provides for a rinse added fabric softening composition further comprising a cationic starch. Cationic starches are disclosed in US 2004/0204337 A1. In one aspect, the rinse added fabric softening composition comprises from about 0.1% to about 7% of cationic starch by weight of the fabric softening composition. In one aspect, the cationic starch is HCP401 from National Starch.

In another aspect the fabric softening active is a particle comprising silicone and clay, such as polydimethylsiloxane and bentonite clay. The particle may also comprise anionic detersive surfactant, such as linear alkylbenzene sulphonate.

Builders—The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds, ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

In one aspect of the present invention, the laundry care composition is a free-flowing solid particulate laundry detergent composition, and can comprise builders selected from the group consisting of: zeolites; phosphates; citrates; and combinations thereof. The composition typically comprises from 0 wt % to 10 wt % zeolite builder, or from above 0 wt %, and to 8 wt %, or to 6 wt %, or to 4 wt %, or to 3 wt %, or to 2 wt %, or even to 1 wt % zeolite builder. The composition may even be substantially free of zeolite builder; substantially free typically means "no deliberately added". Typical zeolite builders include zeolite A, zeolite P, zeolite MAP, zeolite X and zeolite Y. The composition typically comprises from 0 wt % to 10 wt % phosphate builder, or from above 0 wt %, and to 8 wt %, or to 6 wt %, or to 4 wt %, or to 3 wt %, or to 2 wt %, or even to 1 wt % phosphate builder. The composition may even be substantially free of phosphate builder, substantially free means "no deliberately added". A typical phosphate builder is sodium tri-polyphosphate (STPP). A suitable citrate is sodium citrate. However, citric acid may also be incorporated into the composition, which can form citrate in the wash liquor.

Buffer and Alkalinity Source:

Suitable buffers and alkalinity sources include carbonate salts and/or silicate salts and/or double salts such as burkeitte.

Carbonate Salt:

A suitable carbonate salt is sodium carbonate and/or sodium bicarbonate. The composition may comprise bicarbonate salt. It may be suitable for the composition to comprise low levels of carbonate salt, for example, it may be suitable for the composition to comprise from 0 wt % to 10 wt % carbonate salt, or to 8 wt %, or to 6 wt %, or to 4 wt %, or to 3 wt %, or to 2 wt %, or even to 1 wt % carbonate salt. The composition may even be substantially free of carbonate salt; substantially free means "no deliberately added".

The carbonate salt may have a weight average mean particle size of from 100 to 500 micrometers. Alternatively, the carbonate salt may have a weight average mean particle size of from 10 to 25 micrometers.

The composition may comprise from 0 wt % to 20 wt % silicate salt, or to 15 wt %, or to 10 wt %, or to 5 wt %, or to 4 wt %, or even to 2 wt %, and may comprise from above 0 wt %, or from 0.5 wt %, or even from 1 wt % silicate salt. The silicate can be crystalline or amorphous. Suitable crystalline silicates include crystalline layered silicate, such as SKS-6. Other suitable silicates include 1.6R silicate and/or 2.0R silicate. A suitable silicate salt is sodium silicate. Another suitable silicate salt is sodium metasilicate.

The composition may comprise from 0 wt % to 70% filler. Suitable fillers include sulphate salts and/or bio-filler materials. A suitable bio-filler material is alkali and/or bleach treated agricultural waste. A suitable sulphate salt is sodium sulphate. The sulphate salt may have a weight average mean particle size of from 100 to 500 micrometers, alternatively, the sulphate salt may have a weight average mean particle size of from 10 to 45 micrometers.

Chelating Agents—The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein. Suitable chelants may be selected from: diethylene triamine pentaacetate, diethylene triamine penta(methyl phosphonic acid), ethylene diamine-N'N'-disuccinic acid, ethylene diamine tetraacetate, ethylene diamine tetra(methylene phosphonic acid), hydroxyethane di(methylene phosphonic acid), and any combination thereof. A suitable chelant is ethylene diamine-N'N'-disuccinic acid (EDDS) and/or hydroxyethane diphosphonic acid (HEDP). The laundry detergent composition may comprise ethylene diamine-N'N'-disuccinic acid or salt thereof. The ethylene diamine-N'N'-disuccinic acid may be in S,S enantiomeric form. The composition may comprise 4,5-dihydroxy-m-benzenedisulfonic acid disodium salt, glutamic acid-N,N-diacetic acid (GLDA) and/or salts thereof, 2-hydroxypyridine-1-oxide, Trilon P™ available from BASF, Ludwigshafen, Germany. Suitable chelants may also be calcium carbonate crystal growth inhibitors. Suitable calcium carbonate crystal growth inhibitors may be selected from the group consisting of: 1-hydroxyethanediphosphonic acid (HEDP) and salts thereof; N,N-dicarboxymethyl-2-aminopentane-1,5-dioic acid and salts thereof; 2-phosphonobutane-1,2,4-tricarboxylic acid and salts thereof; and any combination thereof.

The composition may comprise a calcium carbonate crystal growth inhibitor, such as one selected from the group consisting of: 1-hydroxyethanediphosphonic acid (HEDP) and salts thereof; N,N-dicarboxymethyl-2-aminopentane-1,5-dioic acid and salts thereof; 2-phosphonobutane-1,2,4-tricarboxylic acid and salts thereof; and any combination thereof.

Photobleaches—Suitable photobleaches are zinc and/or aluminium sulphonated phthalocyanines.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Polymers—Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Suitable carboxylate polymers include maleate/acrylate random copolymer or polyacrylate homopolymer. The carboxylate polymer may be a polyacrylate homopolymer having a molecular weight of from 4,000 Da to 9,000 Da, or from 6,000 Da to 9,000 Da. Other suitable carboxylate polymers are co-polymers of maleic acid and acrylic acid, and may have a molecular weight in the range of from 4,000 Da to 90,000 Da.

Suitable polyethylene glycol polymers include random graft co-polymers comprising: (i) hydrophilic backbone comprising polyethylene glycol; and (ii) hydrophobic side chain(s) selected from the group consisting of: $C_4$-$C_{25}$ alkyl group, polypropylene, polybutylene, vinyl ester of a saturated $C_1$-$C_6$ mono-carboxylic acid, $C_1$-$C_6$ alkyl ester of acrylic or methacrylic acid, and mixtures thereof. Suitable polyethylene glycol polymers have a polyethylene glycol backbone with random grafted polyvinyl acetate side chains. The average molecular weight of the polyethylene glycol backbone can be in the range of from 2,000 Da to 20,000 Da, or from 4,000 Da to 8,000 Da. The molecular weight ratio of the polyethylene glycol backbone to the polyvinyl acetate side chains can be in the range of from 1:1 to 1:5, or from 1:1.2 to 1:2. The average number of graft sites per ethylene oxide units can be less than 1, or less than 0.8, the average number of graft sites per ethylene oxide units can be in the range of from 0.5 to 0.9, or the average number of graft sites per ethylene oxide units can be in the range of from 0.1 to 0.5, or from 0.2 to 0.4. A suitable polyethylene glycol polymer is Sokalan HP22.

Suitable polyester soil release polymers have a structure as defined by one of the following structures (I), II) or (III):

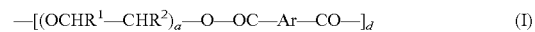

—[(OCHR$^1$—CHR$^2$)$_a$—O—OC—Ar—CO—]$_d$     (I)

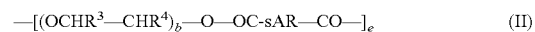

—[(OCHR$^3$—CHR$^4$)$_b$—O—OC-sAR—CO—]$_e$     (II)

—[(OCHR$^5$—CHR$^6$)$_c$—OR$^7$]$_f$     (III)

wherein:
a, b and c are from 1 to 200;
d, e and f are from 1 to 50;
Ar is a 1,4-substituted phenylene;
sAr is 1,3-substituted phenylene substituted in position 5 with SO$_3$Me;
Me is H, Na, Li, K, Mg/2, Ca/2, Al/3, ammonium, mono-, di-, tri-, or tetraalkylammonium wherein the alkyl groups are $C_1$-$C_{18}$ alkyl or $C_2$-$C_{10}$ hydroxyalkyl, or any mixture thereof;
R$^1$, R$^2$, R$^3$, R$^4$, R$^5$ and R$^6$ are independently selected from H or $C_1$-$C_{18}$ n- or iso-alkyl; and
R$^7$ is a linear or branched $C_1$-$C_{18}$ alkyl, or a linear or branched $C_2$-$C_{30}$ alkenyl, or a cycloalkyl group with 5 to 9 carbon atoms, or a $C_8$-$C_{30}$ aryl group, or a $C_6$-$C_{30}$ arylalkyl group.

Suitable polyester soil release polymers are terephthalate polymers having the structure of formula (I) or (II) above.

Suitable polyester soil release polymers include the Repel-o-tex series of polymers such as Repel-o-tex SF2 (Rhodia) and/or the Texcare series of polymers such as Texcare SRA300 (Clariant).

Suitable amine polymers include polyethylene imine polymers, such as alkoxylated polyalkyleneimines, optionally comprising a polyethylene and/or polypropylene oxide block.

The composition can comprise cellulosic polymers, such as polymers selected from alkyl cellulose, alkyl alkoxyalkyl cellulose, carboxyalkyl cellulose, alkyl carboxyalkyl, and any combination thereof. Suitable cellulosic polymers are selected from carboxymethyl cellulose, methyl cellulose, methyl hydroxyethyl cellulose, methyl carboxymethyl cellulose, and mixtures thereof. The carboxymethyl cellulose can have a degree of carboxymethyl substitution from 0.5 to 0.9 and a molecular weight from 100,000 Da to 300,000 Da. Another suitable cellulosic polymer is hydrophobically modified carboxymethyl cellulose, such as Finnfix SH-1 (CP Kelco).

Other suitable cellulosic polymers may have a degree of substitution (DS) of from 0.01 to 0.99 and a degree of blockiness (DB) such that either DS+DB is of at least 1.00 or $DB+2DS-DS^2$ is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose.

Another suitable cellulosic polymer is cationically modified hydroxyethyl cellulose. Suitable polymers include hexamethylenediamine derivative polymers, typically having the formula:

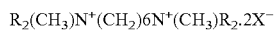

wherein $X^-$ is a suitable counter-ion, for example chloride, and R is a poly(ethylene glycol) chain having an average degree of ethoxylation of from 20 to 30. Optionally, the poly(ethylene glycol) chains may be independently capped with sulphate and/or sulphonate groups, typically with the charge being balanced by reducing the number of $X^-$ counter-ions, or (in cases where the average degree of sulphation per molecule is greater than two), introduction of $Y^+$ counter-ions, for example sodium cations.

Modified carboxylate polymers—suitable polymers are co-polymers comprising (i) from 50 to less than 98 wt % structural units derived from one or more monomers comprising carboxyl groups, (ii) from 1 to less than 49 wt % structural units derived from one or more monomers comprising sulfonate moieties and (iii) from 1 to 49 wt % structural units derived from one or more types of monomers selected from ether bond-containing monomers represented by Formulas (I) and (II):

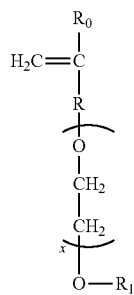

Formula (I)

in Formula (I), $R_0$ represents a hydrogen atom or $CH_3$ group, R represents a $CH_2$ group, $CH_2CH_2$ group or single bond, X represents a number 0-5 (provided X represents a number 1-5 when R is a single bond), and $R_1$ is a hydrogen atom or $C_1$ to $C_{20}$ organic group,

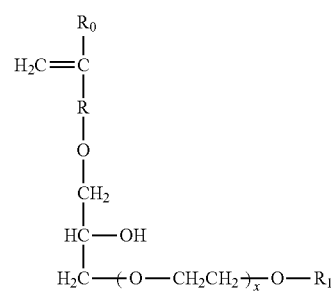

Formula (II)

In Formula (II), $R_0$ represents a hydrogen atom or $CH_3$ group, R represents a $CH_2$ group, $CH_2CH_2$ group or single bond, X represents a number 0-5, and $R_1$ is a hydrogen atom or $C_1$ to $C_{20}$ organic group.

Enzymes—The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

The composition may comprise a protease. Suitable proteases include metalloproteases and/or serine proteases, including neutral or alkaline microbial serine proteases, such as subtilisins (EC 3.4.21.62). Suitable proteases include those of animal, vegetable or microbial origin. In one aspect, such suitable protease may be of microbial origin. The suitable proteases include chemically or genetically modified mutants of the aforementioned suitable proteases. In one aspect, the suitable protease may be a serine protease, such as an alkaline microbial protease or/and a trypsin-type protease. Examples of suitable neutral or alkaline proteases include:

(a) subtilisins (EC 3.4.21.62), including those derived from *Bacillus*, such as *Bacillus lentus*, *Bacillus alkalophilus* (P27963, ELYA_BACAO), *Bacillus subtilis*, *Bacillus amyloliquefaciens* (P00782, SUBT_BACAM), *Bacillus pumilus* (P07518) and *Bacillus gibsonii* (DSM 14391).

(b) trypsin-type or chymotrypsin-type proteases, such as trypsin (e.g. of porcine or bovine origin), including the *Fusarium* protease and the chymotrypsin proteases derived from *Cellumonas* (A2RQE2).

(c) metalloproteases, including those derived from *Bacillus amyloliquefaciens* (P06832, NPRE_BACAM).

Suitable proteases include those derived from *Bacillus gibsonii* or *Bacillus Lentus* such as subtilisin 309 (P29600) and/or DSM 5483 (P29599).

Suitable commercially available protease enzymes include: those sold under the trade names Alcalase®, Savinase®, Primase®, Durazym®, Polarzyme®, Kannase®, Liquanase®, Liquanase Ultra®, Savinase Ultra®, Ovozyme®, Neutrase®, Everlase® and Esperase® by Novozymes A/S (Denmark); those sold under the tradename Maxatase®, Maxacal®, Maxapem®, Properase®, Purafect®, Purafect Prime®, Purafect Ox®, FN3®, FN4®, Excellase® and Purafect OXP® by Genencor International; those sold under the tradename Opticlean® and Optimase® by Solvay Enzymes; those available from Henkel/Kemira, namely BLAP (P29599 having the following mutations S99D+S101 R+S103A+V104I+G159S), and variants thereof including BLAP R (BLAP with S3T+V4I+V199M+V205I+L217D), BLAP X (BLAP with S3T+V4I+V205I) and BLAP F49 (BLAP with S3T+V4I+A194P+V199M+V205I+L217D) all from Henkel/Kemira; and KAP (*Bacillus alkalophilus* subtilisin with mutations A230V+S256G+S259N) from Kao.

Suitable amylases are alpha-amylases, including those of bacterial or fungal origin. Chemically or genetically modified mutants (variants) are included. A suitable alkaline alpha-amylase is derived from a strain of *Bacillus*, such as *Bacillus licheniformis*, *Bacillus antylaliquefaciens*, *Bacillus stearothermaphilus*, *Bacillus subtilis*, or other *Bacillus sp.*, such as *Bacillus sp.* NCIB 12289, NCIB 12512, NCIB 12513, sp 707, DSM 9375, DSM 12368, DSMZ no. 12649, KSM AP1378, KSM K36 or KSM K38. Suitable amylases include:

(a) alpha-amylase derived from *Bacillus licheniformis* (P06278, AMY_BACLI), and variants thereof, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

(b) AA560 amylase (CBU30457, HD066534) and variants thereof, especially the variants with one or more substitutions in the following positions: 26, 30, 33, 82, 37, 106, 118, 128, 133, 149, 150, 160, 178, 182, 186, 193, 203, 214, 231, 256, 257, 258, 269, 270, 2.72, 283, 295, 296, 298, 299, 303, 304, 305, 311, 314, 315, 318, 319, 339, 345, 361, 378, 383, 419, 421, 437, 441, 444, 445, 446, 447, 450, 461, 471, 482, 484, optionally that also contain the deletions of D183* and G184*.

(c) variants exhibiting at least 90% identity with the wild-type enzyme from *Bacillus* SP722 (CBU30453, HD066526), especially variants with deletions in the 183 and 184 positions.

Suitable commercially available alpha-amylases are Duramyl®, Liquezyme® Termamyl®, Termamyl Ultra®, Natalase®, Supramyl®, Stainzyme®, Stainzyme Plus®, Fungamyl® and BAN® (Novozymes A/S), Binamylase® and variants thereof (Biocon India Ltd.), Kemzym® AT 9000 (Biozym Ges. m.b.H, Austria), Rapidase®, Purastar®, Optisize HT Plus®, Enzysize®, Powerase® and Purastar Oxam®, Maxamyl® (Genencor International Inc.) and KAM® (KAO, Japan). Suitable amylases are Natalase®, Stainzyme® and Stainzyme Plus®.

The composition may comprise a cellulase. Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum*.

Commercially available cellulases include Celluzyme®, and Carezyme® (Novozymes AJS), Clazinase®, and Puradax HA® (Genencor International Inc.), and KAC-500 (B)® (Kao Corporation).

The cellulase can include microbial-derived endoglucanases exhibiting endo-beta-1,4-glucanase activity (E.C. 3.2.1.4), including a bacterial polypeptide endogenous to a member of the genus *Bacillus sp.* AA349 and mixtures thereof. Suitable endoglucanases are sold under the tradenames Celluclean® and Whitezyme® (Novozymes AJS, Bagsvaerd, Denmark).

The composition may comprise a cleaning cellulase belonging to Glycosyl Hydrolase family 45 having a molecular weight of from 17 kDa to 30 kDa, for example the endoglucanases sold under the tradename Biotouch® NCD, DCC and DCL (AB Enzymes, Darmstadt, Germany).

Suitable cellulases may also exhibit xyloglucanase activity, such as Whitezyme®.

The composition may comprise a lipase. Suitable lipases include those of bacterial or fungal origin. Chemically modified or protein engineered mutants are included. Examples of useful lipases include lipases from *Humicola* (synonym *Thermomyces*), e.g., from *H. lanuginosa* (*T. lanuginosus*), or from *H. insolens*, a *Pseudomonas* lipase, e.g., from *P. alcaligenes* or *P. pseudoalcaligenes*, *P. cepacia*, *P. stutzeri*, *P. fluorescens*, *Pseudomonas* sp. strain SD 705, *P. wisconsinensis*, a *Bacillus* lipase, e.g., from *B. subtilis*, *B. stearothermophilus* or *B. pumilus*.

The lipase may be a "first cycle lipase", optionally a variant of the wild-type lipase from *Thermomyces lanuginosus* comprising T231R and N233R mutations. The wild-type sequence is the 269 amino acids (amino acids 23-291) of the Swissprot accession number Swiss-Prot O59952 (derived from *Thermomyces lanuginosus* (*Humicola lanuginosa*)). Suitable lipases would include those sold under the tradenames Lipex®, Lipolex® and Lipoclean® by Novozymes, Bagsvaerd, Denmark.

The composition may comprise a variant of *Thermomyces lanuginosa* (O59952) lipase having >90% identity with the wild type amino acid and comprising substitution(s) at T231 and/or N233, optionally T231R and/or N233R.

Suitable xyloglucanase enzymes may have enzymatic activity towards both xyloglucan and amorphous cellulose substrates. The enzyme may be a glycosyl hydrolase (GH) selected from GH families 5, 12, 44 or 74. The glycosyl hydrolase selected from GH family 44 is particularly suitable. Suitable glycosyl hydrolases from GH family 44 are the XYG1006 glycosyl hydrolase from *Paenibacillus polyxyma* (ATCC 832) and variants thereof.

Suitable pectate lyases are either wild-types or variants of *Bacillus*-derived pectate lyases (CAF05441, AAU25568) sold under the tradenames Pectawash®, Pectaway® and X-Pect® (from Novozymes A/S, Bagsvaerd, Denmark).

Suitable mannanases are sold under the tradenames Mannaway® (from Novozymes AIS, Bagsvaerd, Denmark), and Purabrite® (Genencor International Inc., Palo Alto, Calif.).

Suitable bleach enzymes include oxidoreductases, for example oxidases such as glucose, choline or carbohydrate oxidases, oxygenases, catalases, peroxidases, like halo-, chloro-, bromo-, lignin-, glucose- or manganese-peroxidases, dioxygenases or laccases (phenoloxidases, polyphenoloxidases). Suitable commercial products are sold under the Guardzyme® and Denilite® ranges from Novozymes. It may be advantageous for additional organic compounds, especially aromatic compounds, to be incorporated with the bleaching enzyme; these compounds interact with the bleaching enzyme to enhance the activity of the oxidoreductase (enhancer) or to facilitate the electron flow (mediator) between the oxidizing enzyme and the stain typically over strongly different redox potentials.

Other suitable bleaching enzymes include perhydrolases, which catalyse the formation of peracids from an ester substrate and peroxygen source. Suitable perhydrolases include variants of the *Mycobacterium smegmatis* perhydrolase, variants of so-called CE-7 perhydrolases, and variants of wild-type subtilisin Carlsberg possessing perhydrolase activity.

Suitable cutinases are defined by E.C. Class 3.1.1.73, optionally displaying at least 90%, or 95%, or most optionally at least 98% identity with a wild-type derived from one of *Fusarium solani, Pseudomonas Mendocina* or *Humicola Insolens*.

The relativity between two amino acid sequences is described by the parameter "identity". For purposes of the present invention, the alignment of two amino acid sequences is determined by using the Needle program from the EMBOSS package (http://emboss.org) version 2.8.0. The Needle program implements the global alignment algorithm described in Needleman, S. B. and Wunsch, C. D. (1970) J. Mol. Biol. 48, 443-453. The substitution matrix used is BLOSUM62, gap opening penalty is 10, and gap extension penalty is 0.5.

Enzyme Stabilizers-Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Perfumes—suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

Suitable fabric—softening agents include clay, silicone and/or quaternary ammonium compounds. Suitable clays include montmorillonite clay, hectorite clay and/or laponite clay. A suitable clay is montmorillonite clay. Suitable silicones include amino-silicones and/or polydimethylsiloxane (PDMS). A suitable fabric softener is a particle comprising clay and silicone, such as a particle comprising montmorillonite clay and PDMS.

Suitable flocculants include polyethylene oxide; for example having an average molecular weight of from 300,000 Da to 900,000 Da.

Suitable suds suppressors include silicone and/or fatty acid such as stearic acid.

Suitable aesthetic particles include soap rings, lamellar aesthetic particles, geltin beads, carbonate and/or sulphate salt speckles, coloured clay particles, and any combination thereof.

pH profile—Typically the composition has a pH profile such that upon dissolution in de-ionized water at 20° C. and to a concentration of 2 g/L, the composition provides a wash liquor having an equilibrium pH of from 9.5 to 11, preferably 10 to 11. Alternatively, the composition may provide a pH profile such that: (i) 3 minutes after contact with water, the pH of the wash liquor is greater than 10; (ii) 10 mins after contact with water, the pH of the wash liquor is less than 9.5; (iii) 20 mins after contact with water, the pH of the wash liquor is less than 9.0; and (iv) optionally, wherein, the equilibrium pH of the wash liquor is in the range of from above 7.0 to 8.5. This dynamic pH profile can be influenced by lowering the reserve alkalinity of the composition, for example such that the composition has a reserve alkalinity to pH 7.5 of less than 15, and by delaying the release of acid into the wash liquor, e.g. by coating the acid source, such as by wax coated citric acid, or palmitic acid coated citric acid. Alternatively, the composition may have a more neutral pH profile, for example such that upon dilution in de-ionized water to a concentration of 2 g/L at 20° C., the composition has an equilibrium pH of from 7.6 to 8.8.

Process of Making

The liquid detergent compositions are in the form of an aqueous solution or uniform dispersion or suspension of surfactant, bluing agent, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, or from about 150 to 400 cps. For purposes of this invention, viscosity is measured with a Brookfield LVDV-TT+ viscometer apparatus using a #21 spindle The liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid detergent compositions, the bluing agent is first combined with one or more liquid components to form a bluing agent premix, and this bluing agent premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the bluing agent premix and the enzyme component are added at a final stage of component additions. In another aspect, the bluing agent is encapsulated prior to addition to the detergent composition, the encapsulated bluing agent is suspended in a structured liquid, and the suspension is added to a composition formulation containing a substantial portion of the balance of components of the laundry detergent composition.

In a preferred embodiment of the invention, the composition is provided in the form of a unitized dose, either tablet form or preferably comprising composition comprising any form such as liquid/gel/granules held within a water-soluble film in what is known as a pouch or pod. The product can be a single or multi-compartment pouch. Multi-compartment pouches are described in more detail in EP-A-2133410.

Water-Soluble Film

Suitable film for forming the pouches is soluble or dispersible in water, and preferably has a water-solubility of at least 50%, preferably at least 75% or even at least 95%, as measured by the method set out here after using a glass-filter with a maximum pore size of 20 microns:

50 grams±0.1 gram of pouch material is added in a pre-weighed 400 ml beaker and 245 ml±1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersability can be calculated. Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60%. The polymer can have any weight average molecular weight, preferably from about 1000 to 1,000,000, more preferably from about 10,000 to 300,000 yet more preferably from about 20,000 to 150,000.

Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35% by weight polylactide and about 65% to 99% by weight polyvinyl alcohol. Preferred for use herein are polymers which are from about 60% to about 98% hydrolysed, preferably about 80% to about 90% hydrolysed, to improve the dissolution characteristics of the material.

Naturally, different film material and/or films of different thickness may be employed in making the compartments. A benefit in selecting different films is that the resulting compartments may exhibit different solubility or release characteristics.

Most preferred film materials are PVA films known under the MonoSol trade reference M8630, M8900, H8779 (as described in the Applicants co-pending applications ref 44528 and 11599) and those described in U.S. Pat. Nos. 6,166,117 and 6,787,512 and PVA films of corresponding solubility and deformability characteristics.

The film material herein can also comprise one or more additive ingredients. For example, it can be beneficial to add plasticisers, for example glycerol, ethylene glycol, diethyleneglycol, propylene glycol, sorbitol and mixtures thereof. Other additives include functional detergent additives to be delivered to the wash water, for example organic polymeric dispersants, etc.

Process for Making the Water-Soluble Pouch

The process of the present invention may be made using any suitable equipment and method. However the multi-compartment pouches are preferably made using the horizontal form filling process. The film is preferably wetting, more preferably heated to increase the malleability thereof. Even more preferably, the method also involves the use of a vacuum to draw the film into a suitable mould. The vacuum drawing the film into the mould can be applied for 0.2 to 5 seconds, preferably 0.3 to 3 or even more preferably 0.5 to 1.5 seconds, once the film is on the horizontal portion of the surface. This vacuum may preferably be such that it provides an under-pressure of between −100 mbar to −1000 mbar, or even from −200 mbar to −600 mbar.

The moulds, in which the pouches are made, can have any shape, length, width and depth, depending on the required dimensions of the pouches. The moulds can also vary in size and shape from one to another, if desirable. For example, it may be preferred that the volume of the final pouches is between 5 and 300 ml, or even 10 and 150 ml or even 20 and 100 ml and that the mould sizes are adjusted accordingly.

Heat can be applied to the film, in the process commonly known as thermoforming, by any means. For example the film may be heated directly by passing it under a heating element or through hot air, prior to feeding it onto the surface or once on the surface. Alternatively it may be heated indirectly, for example by heating the surface or applying a hot item onto the film. Most preferably the film is heated using an infra red light. The film is preferably heated to a temperature of 50 to 120° C., or even 60 to 90° C. Alternatively, the film can be wetted by any mean, for example directly by spraying a wetting agent (including water, solutions of the film material or plasticizers for the film material) onto the film, prior to feeding it onto the surface or once on the surface, or indirectly by wetting the surface or by applying a wet item onto the film.

In the case of pouches comprising powders it is advantageous to pin prick the film for a number of reasons: firstly, to reduce the possibility of film defects during the pouch formation. For example film defects giving rise to rupture of the film can be generated if the stretching of the film is too fast. Secondly to permit the release of any gases derived from the product enclosed in the pouch, as for example oxygen formation in the case of powders containing bleach. Thirdly, to allow the continuous release of perfume. Moreover, when heat and/or wetting is used, pin pricking can be used before, during or after the use of the vacuum, preferably during or before application of the vacuum. Preferred is thus that each mould comprises one or more holes which are connected to a system which can provide a vacuum through these holes, onto the film above the holes, as described herein in more detail.

Once a film has been heated/wetted, it is drawn into an appropriate mould, preferably using a vacuum. The filling of the moulded film can be done by any known method for filling (moving) items. The most preferred method will depend on the product form and speed of filling required. Preferably the moulded film is filled by in-line filling techniques. The filled, open pouches are then closed, using a second film, by any suitable method, Preferably, this is also done while in horizontal position and in continuous, constant motion. Preferably the closing is done by continuously feeding a second material or film, preferably water-soluble film, over and onto the web of open pouches and then preferably sealing the first film and second film together, typically in the area between the moulds and thus between the pouches.

Preferred methods of sealing include heat sealing, solvent welding, and solvent or wet sealing. It is preferred that only the area which is to form the seal, is treated with heat or solvent. The heat or solvent can be applied by any method, preferably on the closing material, preferably only on the areas which are to form the seal. If solvent or wet sealing or welding is used, it may be preferred that heat is also applied. Preferred wet or solvent sealing/welding methods include applying selectively solvent onto the area between the moulds, or on the closing material, by for example, spraying or printing this onto these areas, and then applying pressure onto these areas, to form the seal. Sealing rolls and belts as described above (optionally also providing heat) can be used, for example.

The formed pouches can then be cut by a cutting device. Cutting can be done using any known method. It may be preferred that the cutting is also done in continuous manner, and preferably with constant speed and preferably while in horizontal position. The cutting device can, for example, be a sharp item or a hot item, whereby in the latter case, the hot item 'burns' through the film/sealing area.

The different compartments of a multi-compartment pouch may be made together in a side-by-side style and consecutive pouches are not cut. Alternatively, the compartments can be made separately. According to this process and preferred arrangement, the pouches are made according to the process comprising the steps of:
a) forming an first compartment (as described above);
b) forming a recess within some or all of the closed compartment formed in step (a), to generate a second moulded compartment superposed above the first compartment;
c) filling and closing the second compartments by means of a third film;
d) sealing said first, second and third films; and
e) cutting the films to produce a multi-compartment pouch.

Said recess formed in step b is preferably achieved by applying a vacuum to the compartment prepared in step a).

Alternatively the second, and optionally third, compartment(s) can be made in a separate step and then combined with the first compartment as described in our co-pending application EP 08101442.5 which is incorporated herein by reference. A particularly preferred process comprises the steps of:
a) forming a first compartment, optionally using heat and/or vacuum, using a first film on a first forming machine;
b) filling said first compartment with a first composition;
c) on a second forming machine, deforming a second film, optionally using heat and vacuum, to make a second and optionally third moulded compartment;
d) filling the second and optionally third compartments;
e) sealing the second and optionally third compartment using a third film;
f) placing the sealed second and optionally third compartments onto the first compartment;
g) sealing the first, second and optionally third compartments; and
h) cutting the films to produce a multi-compartment pouch The first and second forming machines are selected based on their suitability to perform the above process. The first forming machine is preferably a horizontal forming machine. The second forming machine is preferably a rotary drum forming machine, preferably located above the first forming machine.

It will be understood moreover that by the use of appropriate feed stations, it is possible to manufacture multi-compartment pouches incorporating a number of different or distinctive compositions and/or different or distinctive liquid, gel or paste compositions.

As noted previously, the detergent compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the bluing agent is provided in particulate form, optionally including additional but not all components of the laundry detergent composition. The bluing agent particulate is combined with one or more additional particulates containing a balance of components of the laundry detergent composition. Further, the bluing agent, optionally including additional but not all components of the laundry detergent composition, may be provided in an encapsulated form, and the bluing agent encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, for example in a conventional fabric laundering automatic washing machine, to form such aqueous laundering solutions. The aqueous washing solution so formed is then contacted, typically under agitation, with the fabrics to be laundered therewith. An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Typically, the wash liquor is formed by contacting the laundry detergent to water in such an amount so that the concentration of laundry detergent composition in the wash liquor is from above 0 g/l to 5 g/l, or from 1 g/l, and to 4.5 g/l, or to 4.0 g/l, or to 3.5 g/l, or to 3.0 g/l, or to 2.5 g/l, or even to 2.0 g/l, or even to 1.5 g/l. The method of laundering fabric may be carried out in a top-loading or front-loading automatic washing machine, or can be used in a hand-wash laundry application. In these applications, the wash liquor formed and concentration of laundry detergent composition in the wash liquor is that of the main wash cycle. Any input of water during any optional rinsing step(s) is not included when determining the volume of the wash liquor.

The wash liquor may comprise 40 litres or less of water, or 30 litres or less, or 20 litres or less, or 10 litres or less, or 8 litres or less, or even 6 litres or less of water. The wash liquor may comprise from above 0 to 15 litres, or from 2 litres, and to 12 litres, or even to 8 litres of water. Typically from 0.01 kg to 2 kg of fabric per litre of wash liquor is dosed into said wash liquor. Typically from 0.01 kg, or from 0.05 kg, or from 0.07 kg, or from 0.10 kg, or from 0.15 kg, or from 0.20 kg, or from 0.25 kg fabric per litre of wash liquor is dosed into said wash liquor. Optionally, 50 g or less, or 45 g or less, or 40 g or less, or 35 g or less, or 30 g or less, or 25 g or less, or 20 g or less, or even 15 g or less, or even 10 g or less of the composition is contacted to water to form the wash liquor.

Method of Use

Certain of the consumer products disclosed herein can be used to clean or treat a situs inter alia a surface or fabric. Typically at least a portion of the situs is contacted with an embodiment of Applicants' consumer product, in neat form or diluted in a liquor, for example, a wash liquor and then the situs may be optionally washed and/or rinsed. In one aspect, a situs is optionally washed and/or rinsed, contacted with an aspect of the consumer product and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Employing one or more of the aforementioned methods results in a treated situs.

EXAMPLES

The following examples are provided to further illustrate the bluing agents of the present invention; however, they are not to be construed as limiting the invention as defined in the claims appended hereto. In fact, it will be apparent to those skilled in the art that various modifications and variations can be made in this invention without departing from the scope or spirit of the invention. All parts and percents given in these examples are by weight unless otherwise indicated.

Sample Preparation and Test Methods

A. Sample Preparation

The following bis-azo colorants are prepared as described herein. The UV-visible spectrum of each colorant is determined by dissolving it in a suitable solvent, typically water or methanol, at a concentration that gives an absorbance at the lambda max of less than 1.0 at a path length of 1.0 cm. A Beckman Coulter DU 800 spectrophotometer was used to measure the UV-visible spectrum and determine the lambda max ("$\lambda_{max}$") of each sample.

Example 1

To an aqueous suspension of 11.68 grams of p-acetamidobenzenesulfonyl chloride cooled to 15-20° C. is added 8.15 grams of 3-(2-(2-hydroxyethoxy)ethoxy)propylamine at a rate sufficient to keep the temperature below 20° C. Aqueous sodium hydroxide solution is added as needed to keep the pH at >7. After 2 hours of stirring, the reaction is complete and 50 ml of concentrated hydrochloric acid is added, and the mixture refluxed until the infrared spectrum indicated that the acetyl group has been cleaved. The mixture is cooled to 0-5° C. and 3.58 grams of sodium nitrite is added to the mixture and stirred for 2 hours. The resulting diazonium salt is added to a cooled solution of 6.85 grams of 2-methoxy-5-methylaniline in dilute aqueous hydrochloric acid resulting in a deep orange red product. This product is further diazotized at 0-5° C. by adding 3.58 grams of sodium nitrite with additional hydrochloric acid as necessary to keep the pH at <2. The mixture is stirred for 2 hours. The resulting diazonium salt is added to a cooled (0-5° C.) aqueous solution of H-acid in water containing sufficient sodium hydroxide to dissolve the H-acid. The pH of the reaction mixture is kept at 10-12 during the addition of the diazonium salt by adding sodium hydroxide solution as necessary. This resulted in a solution of the deep violet colored product represented as Formula BA4 herein. The product has a $\lambda_{max}$ of 569 nm in water.

Example 2

The product represented as Formula BA13 herein is prepared in a similar manner to Example 1 except 7.65 grams of 2,5-dimethoxyaniline are substituted for 2-methoxy-5-methylaniline. The product has a $\lambda_{max}$ of 583 nm in water.

Example 3

The product represented as Formula BA31 herein is prepared in a similar manner to Example 1 except 9.75 grams of N-acetyl-H acid are substituted for H acid. The product has a $\lambda_{max}$ of 560 nm in water.

Example 4

The product represented as Formula BA58 herein is prepared in a similar manner to Example 1 except 15.75 grams of N-phenyl J acid are substituted for H acid. The product has a $\lambda_{max}$ of 545 nm in water.

Example 5

The product represented as Formula BA herein is prepared in a similar manner to Example 2 except 15.75 grams of N-phenyl J acid are substituted for H acid. The product has a $\lambda_{max}$ of 558 nm in water.

Example 6

The product represented as Formula BA5 herein is prepared in a similar manner to Example 1 except 8.85 grams of 3-(2-(2-methoxyethoxy)ethoxy)propylamine are substituted for 3-(2-(2-hydroxyethoxy)ethoxy)propylamine. The product has a $\lambda_{max}$ of 577 nm in water.

Example 7

The product represented as Formula BA14 herein is prepared in a similar manner to Example 6 except 7.65 grams of 2,5-dimethoxyaniline are substituted for 2-methoxy-5-methylaniline. The product has a $\lambda_{max}$ of 608 nm in methanol.

Example 8

The product represented as Formula BA12 herein is prepared in a similar manner to Example 7 except 30.70 grams of Surfonamine® B60 are substituted for 3-(2-(2-methoxyethoxy)ethoxy)propylamine. The product has a $\lambda_{max}$ of 590 nm in water.

Example 9

The product represented as Formula BA2 herein is prepared in a similar manner to Example 6 except 52.90 grams of Surfonamine® L100 are substituted for 3-(2-(2-methoxyethoxy)ethoxy)propylamine. The product has a $\lambda_{max}$ of 581 nm in water.

Example 10

The product represented as Formula BA11 herein is prepared in a similar manner to Example 8 except 52.90 grams of Surfonamine® L100 are substituted for 3-(2-(2-methoxyethoxy)ethoxy)propylamine. The product has a $\lambda_{max}$ of 578 nm in water.

Example 11

To a cold (0-5° C.) solution of p-polyalkyleneoxyphenylamine (27.45 grams in 100 ml of water), containing sufficient hydrochloric acid to give a pH of 1, are added 3.58 grams of sodium nitrite.

The mixture is stirred for 2 hours. The mixture is then added to a cold solution of 7.65 grams of 2,5-dimethoxyaniline in dilute hydrochloric acid to give an orange colored product. This product is further diazotized by adding sufficient hydrochloric acid to keep the pH at 1 followed by 3.58 grams of sodium nitrite. After stirring 2 hours at 0-5° C., the mixture is added to an aqueous solution of 15.85 grams of H acid along with sufficient sodium hydroxide to dissolve the H acid. During the addition of the diazonium salt, the pH is kept at 10-12 by the addition of aqueous sodium hydroxide solution. This resulted in a violet colored product represented as Formula BA18 herein. The product has a $\lambda_{max}$ of 574 nm in methanol.

Example 12

The product represented as Formula BA15 herein is prepared in a similar manner to Example 2 except 27.45 grams of p-polyalkyleneoxyphenylamine are substituted for 3-(2-(2-hydroxyethoxy)ethoxy)propylamine. The product has a $\lambda_{max}$ of 574 nm in methanol.

Example 13

The product represented as Formula BA17 herein is prepared in a similar manner to Example 2 except 5.25 grams of diethanolamine are substituted for 3-(2-(2-hydroxyethoxy)ethoxy)propylamine. The product has a $\lambda_{max}$ of 581 nm in water.

Example 14

The product represented as Formula BA1 herein is prepared in a similar manner to Example 1 except 35.75 grams of Jeffamine® M715 are substituted for 3-(2-(2-hydroxyethoxy)ethoxy)propylamine. The product has a $\lambda_{max}$ of 578 nm in water.

Example 15

The product represented as Formula BA28 herein is prepared in a similar manner to Example 3 except 35.75 grams of Jeffamine® M715 are substituted for 3-(2-(2-hydroxyethoxy)ethoxy)propylamine. The product has a $\lambda_{max}$ of 563 nm in water.

Example 16

The product represented as Formula BA55 herein is prepared in a similar manner to Example 4 except 35.75 grams of Jeffamine® M715 are substituted for 3-(2-(2-hydroxyethoxy)ethoxy)propylamine. The product has a $\lambda_{max}$ of 545 nm in methanol.

Example 17

The product represented as Formula BA34 herein is prepared in a similar manner to Example 3 except 3.65 grams of diethylamine are substituted for 3-(2-(2-hydroxyethoxy)ethoxy)propylamine. The product has a $\lambda_{max}$ of 560 nm in water.

Example 18

The product represented as Formula BA61 herein is prepared in a similar manner to Example 17 except 15.75 grams of N-phenyl J acid are substituted for N-acetyl H acid. The product has a $\lambda_{max}$ of 551 nm in methanol.

Example 19

The product represented as Formula BA7 herein is prepared in a similar manner to Example 17 except 15.90 grams of H acid are substituted for N-acetyl H acid. The product has a $\lambda_{max}$ of 599 nm in methanol.

The bis-azo colorants set forth in Table A conform generally to Structure (II) and are prepared according to the methods described herein.

TABLE A

| Bis-Azo Colorants | | | | | | |
|---|---|---|---|---|---|---|
| Sample No. | R1 | R2 | W | X | Y | Z |
| Example 1 | CH$_3$O | CH$_3$ | 3-(2-(2-hydroxy-ethoxy)-ethoxy)-propylamino | NH$_2$ | SO$_3$Na | SO$_3$Na |

TABLE A-continued

Bis-Azo Colorants

| Sample No. | R1 | R2 | W | X | Y | Z |
|---|---|---|---|---|---|---|
| Example 2 | CH$_3$O | CH$_3$O | 3-(2-(2-hydroxy-ethoxy)-ethoxy)-propylamino | NH$_2$ | SO$_3$Na | SO$_3$Na |
| Example 3 | CH$_3$O | CH$_3$ | 3-(2-(2-hydroxy-ethoxy)-ethoxy)-propylamino | NHAcetyl | SO$_3$Na | SO$_3$Na |
| Example 4 | CH$_3$O | CH$_3$ | 3-(2-(2-hydroxy-ethoxy)-ethoxy)-propylamino | H | SO$_3$Na | NHPhenyl |
| Example 5 | CH$_3$O | CH$_3$O | 3-(2-(2-hydroxy-ethoxy)-ethoxy)-propylamino | H | SO$_3$Na | NHPhenyl |
| Example 6 | CH$_3$O | CH$_3$ | 3-(2-(2-methoxy-ethoxy)-ethoxy)-propylamino | NH$_2$ | SO$_3$Na | SO$_3$Na |
| Example 7 | CH$_3$O | CH$_3$O | 3-(2-(2-methoxy-ethoxy)-ethoxy)-propylamino | NH$_2$ | SO$_3$Na | SO$_3$Na |
| Example 8 | CH$_3$O | CH$_3$O | Surfonamine® B60 | NH$_2$ | SO$_3$Na | SO$_3$Na |
| Example 9 | CH$_3$O | CH$_3$ | Surfonamine® L100 | NH$_2$ | SO$_3$Na | SO$_3$Na |
| Example 10 | CH$_3$O | CH$_3$O | Surfonamine® L100 | NH$_2$ | SO$_3$Na | SO$_3$Na |
| Example 12 | CH$_3$O | CH$_3$O | p-polyalkylene-oxyphenyl-amino | NH$_2$ | SO$_3$Na | SO$_3$Na |
| Example 13 | CH$_3$O | CH$_3$O | Dihydroxy-ethylamino | NH$_2$ | SO$_3$Na | SO$_3$Na |
| Example 14 | CH$_3$O | CH$_3$ | Jeffamine® M715 | NH$_2$ | SO$_3$Na | SO$_3$Na |
| Example 15 | CH$_3$O | CH$_3$ | Jeffamine® M715 | NHAcetyl | SO$_3$Na | SO$_3$Na |
| Example 16 | CH$_3$O | CH$_3$ | Jeffamine® M715 | H | SO$_3$Na | NHPhenyl |
| Example 17 | CH$_3$O | CH$_3$ | Diethylamino | NHAcetyl | SO$_3$Na | SO$_3$Na |
| Example 18 | CH$_3$O | CH$_3$ | Diethylamino | H | SO$_3$Na | NHPhenyl |
| Example 19 | CH$_3$O | CH$_3$ | Diethylamino | NH$_2$ | SO$_3$Na | SO$_3$Na |

*Surfonamine® and Jeffamine® products are amino terminated polyalkyleneoxy ethers available from Huntsman Corporation of The Woodlands, Texas that have the general structure:

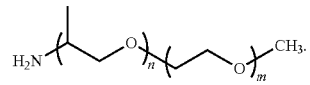

For Example 11, which conforms generally to Structure (I), R$_1$=OCH$_3$, R$_2$=OCH$_3$, R$_3$=6-substituted H acid, and X=p-polyalkyleneoxyphenylazo.

The chemical names for the corresponding colorants of Table A are respectively provided in Table B below. The chemical names are determined using ChemDraw Ultra; Version 7.0.1, available from CambridgeSoft, Cambridge, Mass., USA.

TABLE B

Chemical Names for Bis-Azo Colorants

| Sample No. | Chemical Name |
|---|---|
| Example 1 | 5-Amino-4-hydroxy-3-[4-(4-{3-[2-(2-hydroxy-ethoxy)-ethoxy]-propylsulfamoyl}-phenylazo)-2-methoxy-5-methyl-phenylazo]-naphthalene-2,7-disulfonic acid, disodium salt |
| Example 2 | 5-Amino-4-hydroxy-3-[4-(4-{3-[2-(2-hydroxy-ethoxy)-ethoxy]-propylsulfamoyl}-phenylazo)-2,5-dimethoxy-phenylazo]-naphthalene-2,7-disulfonic acid, disodium salt |
| Example 3 | 5-Acetylamino-4-hydroxy-3-[4-(4-{3-[2-(2-hydroxy-ethoxy)-ethoxy]-propylsulfamoyl}-phenylazo)-5-methoxy-2-methyl-phenylazo]-naphthalene-2,7-disulfonic acid, disodium salt |
| Example 4 | 4-Hydroxy-3-[4-(4-{3-[2-(2-hydroxy-ethoxy)-ethoxy]-propylsulfamoyl}-phenylazo)-5-methoxy-2-methyl-phenylazo]-7-phenylamino-naphthalene-2-sulfonic acid, sodium salt |
| Example 5 | 4-Hydroxy-3-[4-(4-{3-[2-(2-hydroxy-ethoxy)-ethoxy]-propylsulfamoyl}-phenylazo)-2,5-dimethoxy-phenylazo]-7-phenylamino-naphthalene-2-sulfonic acid, sodium salt |
| Example 6 | 5-Amino-4-hydroxy-3-[2-methoxy-4-(4-{3-[2-(2-methoxyethoxy)-ethoxy]-propylsulfamoyl}-phenylazo)-5-methyl-phenylazo]-naphthalene-2,7-disulfonic acid, disodium salt |
| Example 7 | 5-Amino-3-[2,5-dimethoxy-4-(4-{3-[2-(2-methoxy-ethoxy)-ethoxy]-propylsulfamoyl}-phenylazo)-phenylazo]-4-hydroxy-naphthalene-2,7-disulfonic acid |
| Example 8 | 5-Amino-4-hydroxy-3-[2,5-dimethoxy-4-(4-polyalkyleneoxysulfamoylphenylazo)-phenylazo]-naphthalene-2,7-disulfonic acid, disodium salt |
| Example 9 | 5-Amino-4-hydroxy-3-[2-methoxy-4-(4-polyalkyleneoxysulfamoylphenylazo)-5-methyl-phenylazo]-naphthalene-2,7-disulfonic acid, disodium salt |
| Example 10 | 5-Amino-4-hydroxy-3-[2,5-dimethoxy-4-(4-polyalkyleneoxysulfamoylphenylazo)-phenylazo]-naphthalene-2,7-disulfonic acid, disodium salt |

TABLE B-continued

Chemical Names for Bis-Azo Colorants

| Sample No. | Chemical Name |
|---|---|
| Example 11 | 5-Amino-4-hydroxy-3-[2,4-dimethoxy-4-(4-polyalkyleneoxyphenyl)sulfamoylphenylazo]-phenylazo]-naphthalene-2,7-disulfonic acid, disodium salt |
| Example 12 | 5-Amino-4-hydroxy-3-[2,5-dimethoxy-4-(4-polyalkyleneoxysulfamoylphenylazo)-phenylazo]-naphthalene-2,7-disulfonic acid, disodium salt |
| Example 13 | 5-Amino-3-(4-{4-[bis-(2-hydroxy-ethyl)-sulfamoyl]-phenylazo}-2,5-dimethoxy-phenylazo)-4-hydroxy-naphthalene-2,7-disulfonic acid, disodium salt |
| Example 14 | 5-Amino-4-hydroxy-3-[4-(4-polyalkyleneoxysulfamoyl-phenylazo)-2-methoxy-5-methyl-phenylazo]-naphthalene-2,7-disulfonic acid, disodium salt |
| Example 15 | 5-Acetylamino-4-hydroxy-3-[4-polyoxalkyenesulfamoylphenylazo)-5-methoxy-2-methyl-phenylazo]-naphthalene-2,7-disulfonic acid, disodium salt |
| Example 16 | 4-Hydroxy-3-[4-(4-polyalkyleneoxysulfamoyl-phenylazo)-5-methoxy-2-methyl-phenylazo]-7-phenylamino-naphthalene-2-sulfonic acid, sodium salt |
| Example 17 | 5-Acetylamino-3-[4-(4-diethylsulfamoyl-phenylazo)-5-methoxy-2-methyl-phenylazo]-4-hydroxy-naphthalene-2,7-disulfonic acid, disodium salt |
| Example 18 | 3-[4-(4-Diethylsulfamoyl-phenylazo)-2-methoxy-5-methyl-phenylazo]-4-hydroxy-7-phenylamino-naphthalene-2-sulfonic acid, sodium salt |
| Example 19 | 5-Amino-3-[4-(4-diethylsulfamoyl-phenylazo)-5-methoxy-2-methyl-phenylazo]-4-hydroxy-naphthalene-2,7-disulfonic acid, disodium salt |

Structural representations of Examples 1-19 are provided herein.

B. Test Methods

I. Method for Determining Molar Absorptivity ($\varepsilon$)

The Molar Absorptivity is determined by dissolving a known amount of the compound in a suitable solvent and measuring the absorbance of the solution on an ultraviolet-visible spectrophotometer. The absorptivity is calculated by dividing the absorbance by the molar concentration in moles/liter and the path length which is typically one centimeter.

Washing of Fabric: Each dye is run in a simulated wash of CW120 fabric (16 oz white cotton interlock knit fabric, 270 g/square meter, brightened with Uvitex BNB fluorescent whitening agent, from Test Fabrics. P.O. Box 26, Weston, Pa., 18643) using typical conditions for North American heavy duty laundry detergent ("NA HDL" or "HDL") (788 ppm dose, 20° C., 6 gpg 3:1 Ca:Mg, 30:1 liquor: fabric ratio, 30 minutes) at six dilutions, with the highest wash water absorbance being set close to a value of 1.0. Fabrics are rinsed once for 5 minutes and air dried.

L*, a* and b* values are measured on each fabric (four internal replicates for each wash condition) using a Hunter LabScan XE reflectance spectrophotometer with D65 illumination, 10° observer and UV filter excluded, and difference values calculated against a nil-dye HDL reference.

II. Method for Determining Specific Deposition ($Abs^{\Delta b-2}$)

From the plot of wash solution absorbance vs. $\Delta b^*$, the wash solution absorbance necessary to deliver a $\Delta b^*$ of $-2.0$ on fabric is determined by linear interpolation of the two data points that bracket the target $\Delta b^*$.

III. Method for Determining Relative Hue Angle ($\theta_R$) and Absolute Hue Angle ($\theta_A$)

From a plot of $\Delta a^*$ vs. $\Delta b^*$ for each concentration point of a given compound, the $\Delta a^*$ value at $\Delta b^*=-2.0$ is determined by interpolation of the two data points that bracketed $\Delta b^*=-2.0$. The relative hue angle $\theta_R$ is then calculated as $270+\arctan(|\Delta a^*/\Delta b^*|)$ for positive values of $\Delta a^*$ and $270-\arctan(|\Delta a^*/\Delta b^*|)$ where $\Delta a^*$ is negative.

The $\Delta a^*$ value at $\Delta b^*=-2.0$ is added to the a* value, and $-2.0$ is added to the b* value of a tracer fabric washed in nil-dye HDL (a*=2.0; b*=-15.5; average of 24 replicates). The absolute hue angle is determined at the concentration of dye that delivers $\Delta b^*=-2.0$, using $a^*_{Dye}$ and $b^*_{Dye}$ as defined below:

$$a^*_{Dye}=a^*_{tracer}+\Delta a^*_{Dye}=2.0+\Delta a^*_{Dye}$$

$$b^*_{Dye}=b^*_{tracer}\Delta b^*_{Dye}=-15.5+(-2.0)=-17.5.$$

The absolute hue angle $\theta_A$ is calculated as $270+\arctan(|a^*_{Dye}/b^*_{Dye}|)$ for positive values of $a^*_{Dye}$ and $270-\arctan(|a^*_{Dye}/b^*_{Dye}|)$ where $a^*_{Dye}$ is negative.

IV. Method for Determining Surface Color

The surface color of an article may be quantified using a series of measurements—L*, a*, and b*—generated by measuring the samples using a spectrophotometer. The equipment used for this test is a Gretag Macbeth Color Eye 7000A spectrophotometer. The software program used is "Color imatch." "L" is a measure of the amount of white or black in a sample; higher "L" values indicate a lighter colored sample. A measure of the amount of red or green in a sample is determined by "a*" values. A measure of the amount of blue or yellow in a sample is determined by "b*" values; lower (more negative) b* values indicate more blue on a sample.

V. Method for Determining Hueing Efficiency for Detergents a.) Two 25 cm×25 cm fabric swatches of 16 oz white cotton interlock knit fabric (270 g/square meter, brightened with Uvitex BNB fluorescent whitening agent, from Test Fabrics. P.O. Box 26, Weston, Pa., 18643), are obtained.

b.) Prepare two one liter aliquots of tap water containing 1.55 g of AATCC standard heavy duty liquid (HDL) test detergent as set forth in Table 3.

c.) Add a sufficient amount the dye to be tested to one of the aliquots from Step b.) above to produce an aqueous solution absorbance of 1 AU.

d.) Wash one swatch from a.) above in one of the aliquots of water containing 1.55 g of AATCC standard heavy duty liquid (HDL) test detergent and wash the other swatch in the other aliquot. Such washing step should be conducted for 30 minutes at room temperature with agitation. After such washing step separately rinse the swatches in tap water and air dry the swatches in the dark.

e.) After rinsing and drying each swatch, the hueing efficiency, $DE^*_{\mathit{eff}}$, of the dye is assessed by determining the $L^*$, $a^*$, and $b^*$ value measurements of each swatch using a Hunter LabScan XE reflectance spectrophotometer with D65 illumination, 10° observer and UV filter excluded. The hueing efficiency of the dye is then calculated using the following equation:

$$DE^*_{\mathit{eff}}=((L^*_c-L^*_s)^2+(a^*_c-a^*_s)^2+(b^*_c-b^*_s)^2)^{1/2}$$

wherein the subscripts c and s respectively refer to the $L^*$, $a^*$, and $b^*$ values measured for the control, i.e., the fabric sample washed in detergent with no dye, and the fabric sample washed in detergent containing the dye to be screened.

VI. Method for Determining Wash Removability a.) Prepare two separate 150 ml aliquots of HDL detergent solution set forth in Table 1, according to AATCC Test Method 61-2003, Test 2A and containing 1.55 g/liter of the AATCC HDL formula in distilled water.

b.) A 15 cm×5 cm sample of each fabric swatch from the Method for Determining of Hueing Efficiency For Detergents described above is washed in a Launderometer for 45 minutes at 49° C. in 150 ml of a the HDL detergent solution prepared according to Step II. a.) above.

c.) The samples are rinsed with separate aliquots of rinse water and air dried in the dark, and then $L^*$, $a^*$, and $b^*$ value measurements of each swatch are taken using a Hunter LabScan XE reflectance spectrophotometer with D65 illumination, 10° observer and UV filter excluded. The amount of residual coloration is assessed by measuring the $DE^*_{res}$, calculated using the following equation:

$$DE^*_{\mathit{eff}}=((L^*_c-L^*_s)^2+(a^*_c-a^*_s)^2+(b^*_c-b^*_s)^2)^{1/2}$$

wherein the subscripts c and s respectively refer to the $L^*$, $a^*$, and $b^*$ values measured for the control, i.e., the fabric sample initially washed in detergent with no dye, and the fabric sample initially washed in detergent containing the dye to be screened. The wash removal value for the dye is then calculated according to the formula: % removal=100×(1−$DE^*_{res}/DE^*_{\mathit{eff}}$).

VII. Method for Determining Staining

This procedure uses three fabric types to determine the propensity of a dye dissolved in a detergent matrix to stain fabric in a manner similar to a home laundry pre-treat scenario. The three primary fibers examined are cotton, nylon, and spandex (a synthetic polymer having urethane blocks) that comprise the following fabrics:

16 oz cotton interlock knit fabric (270 g/square meter, brightened with Uvitex BNB fluorescent whitening agent, obtained from Test Fabrics. P.O. Box 26, Weston, Pa., 18643), 6.3 oz 90% Cotton/10% Lycra®, Stock # CLF, obtained from Dharma Trading Co., 1604 Fourth St. San Rafael, Calif. 94901, 80% Nylon 120% a Spandex, Item #983684GN, obtained from Hancock Fabrics, One Fashion Way, Baldwyn, Miss. 38824.

A one inch diameter circle for each of the dyed detergent samples was drawn using a template and labeled with the dye identification on the test fabrics with a non-staining, acrylic ink textile marker (TEXPEN textile marker made by Mark-tex Corp., Englewood, N.J. 07631).

The test fabrics were placed on top of a piece of plastic backed paper counter sheet, or alternatively, a single layer of paper towel over aluminum foil, and stained at the 16 hrs, 1 hr, and 15 min time intervals. Staining was done by placing approximately 0.5 g of the dyed detergent on the fabric allowing it to soak through the fabric with the excess being absorbed by the counter sheet so that the circular test area was saturated with detergent without spreading to adjacent test circles. Due to possible light fading of the dyes, they were placed under a covered area to prevent direct exposure to light while allowing air to pass over the fabrics. The 16 hr stains were applied in the evening while the 1 hr and 15 min swatches were stained the following morning prior to washing. The approximate total amount of detergent applied is calculated by multiplying the total number of stained areas by the amount of detergent delivered for each stain. If this amount exceeds the recommended dosage for the detergent then divide the total detergent by the recommended dosage to determine the number of wash loads to distribute the stained fabrics. If the stained fabrics do not provide the total recommended amount of detergent for a load, then the balance of the detergent is filled with Tide Free (nil-dye) detergent.

The pretreated fabrics are washed in a full scale Kenmore top loading washer with 5.5 lbs of terry washcloths used as ballast under median North American conditions of 17 gallons of 90° F./6 grains per gallon of hardness wash water with a rinse of 60° F./6 grains per gallon of hardness water. After the wash is complete the test fabrics are dried with the ballast in a forced heated air drier at the highest temperature setting for 60 minutes, or until completely dry.

The circled stain areas were analyzed using a Hunter Colorquest or Labscan XE with D65 lighting, UV filter not included and a 0.5" port opening. A nil-dye pre-treat control stain was used as the instrument reference standard for calculating the DE* because the detergent contains brightener. Visual assessment is done under fluorescent lights with a white paper (92 brightness) background under the swatch. The DE*/Visual Scale allows communication of stain intensity in a non-technical manner.

DE*/Visual Scale:

<1=0 No visible staining 1-2.5=1 Slightly off white area 2.5-5=2 Light but visible stain 5-10=3 Clearly visible stain >10=4 A dark stain

Test Results
Test 1: Determination of Component Parts of Bis-Azo Colorants
TABLE 1
A, B and C moieties used to construct bluing agents
A—N=N—B—N=N—C.
A Moieties
A1 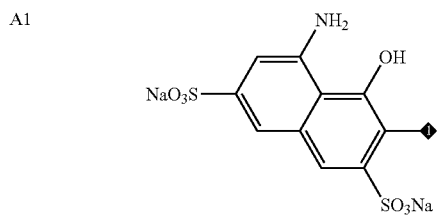
A2 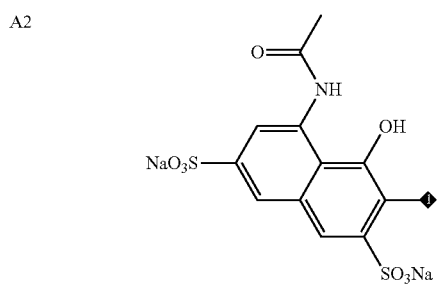
A3 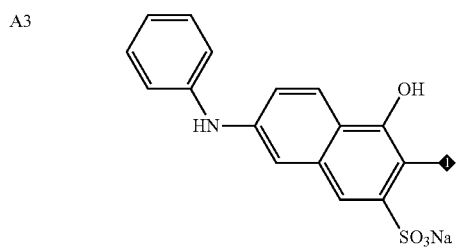
B Moieties
B1 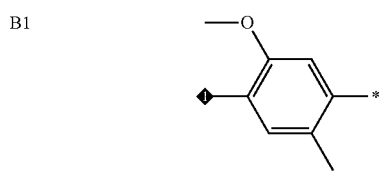
B2 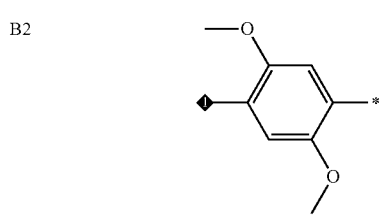
TABLE 1-continued
A, B and C moieties used to construct bluing agents
A—N=N—B—N=N—C.
B3 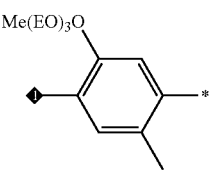
C Moieties
C1 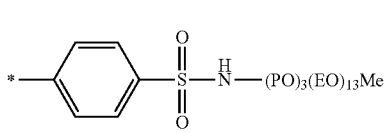
C2 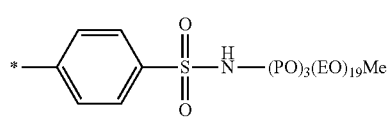
C3 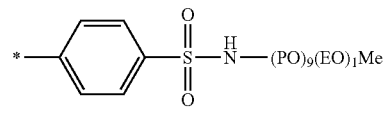
C4 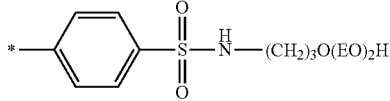
C5 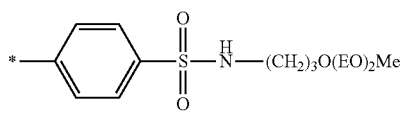
C6 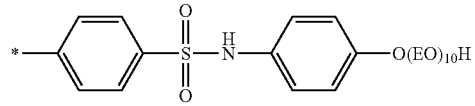
C7 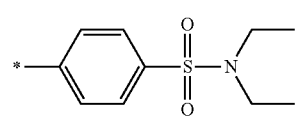
C8 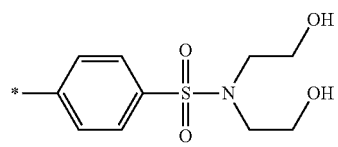
C9 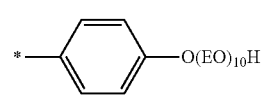

Test 2: Determination of Molar Absorptivity of Bis-Azo Colorants

The molar absorptivity (ε) of each example is provided in Table 2.

TABLE 2

Molar Absorptivity of Bis-Azo Colorants

| Example No. | Molar Abs (ε) |
|---|---|
| Example 1 | 28615 |
| Example 2 | 12399 |
| Example 3 | 23657 |
| Example 4 | 26346 |
| Example 5 | 43706 |
| Example 6 | 21877 |
| Example 7 | 27436 |
| Example 8 | 16620 |
| Example 9 | 34649 |
| Example 10 | 15103 |
| Example 11 | 25427 |
| Example 12 | 8347 |
| Example 13 | 11223 |
| Example 14 | 23691 |
| Example 15 | 28205 |
| Example 16 | 32492 |
| Example 17 | 21645 |
| Example 18 | 34180 |
| Example 19 | 35408 |

Test 3: Determination of Deposition and Hue Angle

Table 3 provides the deposition and hue angle for Examples 1-19. The data is sorted by variation in Components A, B and C, as determined previously.

Components A, B and C, as determined previously.

| | Sample No. | Components A | B | C | Deposition Abs$^{\Delta b-2}$ | Absolute Hue Angle $\theta_A$ | Relative Hue Angle $\theta_R$ |
|---|---|---|---|---|---|---|---|
| Variation in A | Example 14 | 1 | 1 | 1 | 0.0778 | 274.9 | 256.0 |
| | Example 15 | 2 | 1 | 1 | 0.0584 | 277.2 | 275.7 |
| | Example 16 | 3 | 1 | 1 | 0.0436 | 282.9 | 315.0 |
| | Example 1 | 1 | 1 | 4 | 0.0463 | 274.2 | 250.7 |
| | Example 3 | 2 | 1 | 4 | 0.0170 | 277.2 | 275.7 |
| | Example 4 | 3 | 1 | 4 | 0.0341 | 286.2 | 327.2 |
| | Example 19 | 1 | 1 | 7 | 0.0375 | 273.9 | 248.2 |
| | Example 17 | 2 | 1 | 7 | 0.0245 | 275.7 | 262.9 |
| | Example 18 | 3 | 1 | 7 | 0.0181 | 279.4 | 294.2 |
| | Example 2 | 1 | 2 | 4 | 0.0345 | 273.6 | 245.8 |
| | Example 5 | 3 | 2 | 4 | 0.0140 | 276.8 | 272.9 |
| Variation in B | Example 9 | 1 | 1 | 2 | 0.0562 | 274.9 | 256.0 |
| | Example 10 | 1 | 2 | 2 | 0.1223 | 274.6 | 253.3 |
| | Example 1 | 1 | 1 | 4 | 0.0463 | 274.2 | 250.7 |
| | Example 2 | 1 | 2 | 4 | 0.0345 | 273.6 | 245.8 |
| | Example 6 | 1 | 1 | 5 | 0.0209 | 274.9 | 256.0 |
| | Example 7 | 1 | 2 | 5 | 0.0255 | 272.9 | 241.2 |
| | Example 4 | 3 | 1 | 4 | 0.0341 | 286.2 | 327.2 |
| | Example 5 | 3 | 2 | 4 | 0.0140 | 276.8 | 272.9 |
| Variation in C | Example 14 | 1 | 1 | 1 | 0.0778 | 274.9 | 256.0 |
| | Example 14 | | | | 0.0748 | 274.9 | 256.0 |
| | Example 9 | 1 | 1 | 2 | 0.0562 | 274.9 | 256.0 |
| | Example 1 | 1 | 1 | 4 | 0.0463 | 274.2 | 250.7 |
| | Example 6 | 1 | 1 | 5 | 0.0209 | 274.9 | 256.0 |
| | Example 19 | 1 | 1 | 7 | 0.0375 | 273.9 | 248.2 |
| | Example 10 | 1 | 2 | 2 | 0.1223 | 274.6 | 253.3 |
| | Example 8 | 1 | 2 | 3 | 0.0925 | 272.3 | 237.0 |
| | Example 2 | 1 | 2 | 4 | 0.0345 | 273.6 | 245.8 |
| | Example 7 | 1 | 2 | 5 | 0.0255 | 272.9 | 241.2 |
| | Example 12 | 1 | 2 | 6 | 0.0347 | 274.2 | 250.7 |
| | Example 13 | 1 | 2 | 8 | 0.0409 | 272.0 | 235.0 |
| | Example 11 | 1 | 2 | 9 | 0.0905 | 274.9 | 256.0 |
| | Example 15 | 2 | 1 | 1 | 0.0584 | 277.2 | 275.7 |
| | Example 3 | 2 | 1 | 4 | 0.0170 | 277.2 | 275.7 |
| | Example 3 | | | | 0.0168 | 275.9 | 264.3 |
| | Example 17 | 2 | 1 | 7 | 0.0245 | 275.7 | 262.9 |
| | Example 16 | 3 | 1 | 1 | 0.0436 | 282.9 | 315.0 |
| | Example 4 | 3 | 1 | 4 | 0.0341 | 286.2 | 327.2 |
| | Example 18 | 3 | 1 | 7 | 0.0181 | 279.4 | 294.2 |

With respect to the data contained in Table 3, absolute hue angle describes the actual hue angle of the fabric on the a*, b* plane. This is the angle that a consumer actually sees when looking at the fabric. Relative hue angle is determined against a tracer fabric washed in nil-dye HDL (i.e. same detergent, but without dye), and thus gives the movement within the a*, b* plane relative to the nil-dye control.

Thus, the bluing agent of the present invention may have an absolute hue angle in the range of 265° to 310°, 265° to 300°, 265° to 295°, 270° to 295°, 270° to 290°, or even in the range of 273° to 287°.

Exemplary Detergent Formulations

Formulations 1a-1l: Liquid Detergent Formulations

Tables 4A and 4B provide examples of liquid detergent formulations which include at least one bluing agent of the present invention. The formulations are shown in Table 4A as Formulations 1a through 1f and in Table 4B as Formulations 1g through 1l.

TABLE 4A

Liquid Detergent Formulations Comprising the Inventive Bluing Agent

| Ingredient | 1a wt % | 1b wt % | 1c wt % | 1d wt % | 1e wt % | 1f[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |

TABLE 4A-continued

Liquid Detergent Formulations Comprising the Inventive Bluing Agent

| Ingredient | 1a wt % | 1b wt % | 1c wt % | 1d wt % | 1e wt % | 1f[5] wt % |
|---|---|---|---|---|---|---|
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| First bis-azo colorant[6] | | 0.001% | 0.001% | | 0.0005% | |
| Second bis-azo colorant[6] | 0.013% | | 0.005% | 0.003% | | 0.001% |
| water | balance 100.0% | balance 100.0% | balance 100.0% | balance 100.0% | balance 100.0% | balance 100.0% |

TABLE 4B

Liquid Detergent Formulations Comprising the Inventive Bluing Agent

| Ingredient | 1g wt % | 1h wt % | 1i wt % | 1j wt % | 1k wt % | 1l[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 1.7% |
| amylase | 0.2% | 0.2% | 0.2% | | | 0.6% |
| lipase | | | | 0.2% | | 0.2% |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |

TABLE 4B-continued

Liquid Detergent Formulations Comprising the Inventive Bluing Agent

| Ingredient | 1g wt % | 1h wt % | 1i wt % | 1j wt % | 1k wt % | 1l[5] wt % |
|---|---|---|---|---|---|---|
| Non-tinting dyes[4] | 0.0001% | 0.001% | 0.008% | 0.03% | 0.015% | 0.05% |
| First bis-azo colorant[6] | 0.01% | | 0.005% | | 0.005% | |
| Second bis-azo colorant[6] | | 0.01% | 0.02% | 0.003% | | 0.012% |
| opacifier[7] | | 0.5% | | | | |
| water | balance 100.0% | balance 100.0% | balance 100.0% | balance 100.0% | balance 100.0% | balance 100.0% |

Footnotes for Formulations 1a-1:
[1] diethylenetriaminepentaacetic acid, sodium salt
[2] diethylenetriaminepentakismethylenephosphonic acid, sodium salt
[3] ethylenediaminetetraacetic acid, sodium salt
[4] a non-tinting dye or mixture of non-tinting dyes used to adjust formula color
[5] compact formula, packaged as a unitized dose in polyvinyl alcohol film
[6] Bis-azo colorants selected from Examples 1-19, preferably with hueing efficiency >10 and wash removability 30-85%
[7] Acusol OP301

Formulations 2a-2e: Granular Detergent Formulations

Tables 5a and 5b provide examples of granular detergent formulations which include at least one bluing agent of the present invention. The formulations are shown in Table 5a as Formulations 2a through 2e.

TABLE 5a

Granular Detergent Formulations Comprising the Inventive Bluing Agent

| Ingredient | 2a wt % | 2b wt % | 2c wt % | 2d wt % | 2e wt % |
|---|---|---|---|---|---|
| Na linear alkylbenzene sulfonate | 3.4% | 3.3% | 11.0% | 3.4% | 3.3% |
| Na alkylsulfate | 4.0% | 4.1% | | 4.0% | 4.1% |
| Na alkyl sulfate (branched) | 9.4% | 9.6% | | 9.4% | 9.6% |
| alkyl ethoxylate | | | 3.5% | | |
| type A zeolite | 37.4% | 35.4% | 26.8% | 37.4% | 35.4% |
| sodium carbonate | 22.3% | 22.5% | 35.9% | 22.3% | 22.5% |
| sodium sulfate | 1.0% | | 18.8% | 1.0% | |
| sodium silicate | | | 2.2% | | |
| protease | 0.1% | 0.2% | | 0.1% | 0.2% |
| sodium polyacrylate | 1.0% | 1.2% | 0.7% | 1.0% | 1.2% |
| carboxymethylcellulose | | | 0.1% | | |
| PEG 600 | | 0.5% | | | 0.5% |
| PEG 4000 | | 2.2% | | | 2.2% |
| DTPA | 0.7% | 0.6% | | 0.7% | 0.6% |
| fluorescent whitening agent | 0.1% | 0.1% | 0.1% | 0.1% | 0.1% |
| sodium percarbonate | | 5.0% | | | 5.0% |
| sodium nonanoyloxybenzenesulfonate | | 5.3% | | | 5.3% |
| silicone suds suppressor | 0.02% | 0.02% | | 0.02% | 0.02% |
| perfume | 0.3% | 0.3% | 0.2% | 0.3% | 0.3% |
| First bis-azo colorant[1] | 0.004% | | 0.001% | | 0.02% |
| Second bis-azo colorant[1] | | 0.006% | 0.002% | 0.004% | |
| water and miscellaneous | balance | balance | Balance | balance | balance |
| | 100.0% | 100.0% | 100.0% | 100.0% | 100.0% |

[1] Bis-azo colorants selected from Examples 1-19, preferably with hueing efficiency >10 and wash removability of 30-85%.

TABLE 5b

Granular Detergent Formulations Comprising the Inventive Bluing Agent

| Ingredient | Amount (in wt %) |
|---|---|
| Anionic detersive surfactant (such as alkyl benzene sulphonate, alkyl ethoxylated sulphate and mixtures thereof) | from 8 wt % to 15 wt % |
| Non-ionic detersive surfactant (such as alkyl ethoxylated alcohol) | from 0.5 wt % to 4 wt % |
| Cationic detersive surfactant (such as quaternary ammonium compounds) | from 0 to 4 wt % |

TABLE 5b-continued

Granular Detergent Formulations Comprising the Inventive Bluing Agent

| Ingredient | Amount (in wt %) |
|---|---|
| Other detersive surfactant (such as zwiterionic detersive surfactants, amphoteric surfactants and mixtures thereof) | from 0 wt % to 4 wt % |
| Carboxylate polymer (such as co-polymers of maleic acid and acrylic acid) | from 1 wt % to 4 wt % |
| Polyethylene glycol polymer (such as a polyethylene glycol polymer comprising poly vinyl acetate side chains) | from 0.5 wt % to 4 wt % |
| Polyester soil release polymer (such as Repel-o-tex and/or Texcare polymers) | from 0.1 to 2 wt % |
| Cellulosic polymer (such as carboxymethyl cellulose, methyl cellulose and combinations thereof) | from 0.5 wt % to 2 wt % |
| Other polymer (such as amine polymers, dye transfer inhibitor polymers, hexamethylenediamine derivative polymers, and mixtures thereof) | from 0 wt % to 4 wt % |
| Zeolite builder and phosphate builder (such as zeolite 4A and/or sodium tripolyphosphate) | from 0 wt % to 4 wt % |
| Other builder (such as sodium citrate and/or citric acid) | from 0 wt % to 3 wt % |
| Carbonate salt (such as sodium carbonate and/or sodium bicarbonate) | from 15 wt % to 30 wt % |
| Silicate salt (such as sodium silicate) | from 0 wt % to 10 wt % |
| Filler (such as sodium sulphate and/or bio-fillers) | from 10 wt % to 40 wt % |
| Source of available oxygen (such as sodium percarbonate) | from 10 wt % to 20 wt % |
| Bleach activator (such as tetraacetylethylene diamine (TAED) and/or nonanoyloxybenzenesulphonate (NOBS) | from 2 wt % to 8 wt % |
| Bleach catalyst (such as oxaziridinium-based bleach catalyst and/or transition metal bleach catalyst) | from 0 wt % to 0.1 wt % |
| Other bleach (such as reducing bleach and/or pre-formed peracid) | from 0 wt % to 10 wt % |
| Chelant (such as ethylenediamine-N'N'-disuccinic acid (EDDS) and/or hydroxyethane diphosphonic acid (HEDP) | from 0.2 wt % to 1 wt % |
| Photobleach (such as zinc and/or aluminium sulphonated phthalocyanine) | from 0 wt % to 0.1 wt % |
| Hueing agent (such as direct violet 99, acid red 52, acid blue 80, direct violet 9, solvent violet 13 and any combination thereof) | from 0 wt % to 1 wt % |
| Bluing agent (bluing agent according to any of formula BA1-BA81 and any combination thereof) | from 0.00001 wt % to 0.1 wt % |
| Brightener (such as brightener 15 and/or brightener 49) | from 0.1 wt % to 0.4 wt % |
| Protease (such as Savinase, Savinase Ultra, Purafect, FN3, FN4 and any combination thereof) | from 0.1 wt % to 0.4 wt % |
| Amylase (such as Termamyl, Termamyl ultra, Natalase, Optisize, Stainzyme, Stainzyme Plus and any combination thereof) | from 0.05 wt % to 0.2 wt % |
| Cellulase (such as Carezyme and/or Celluclean) | from 0.05 wt % to 0.2 wt % |
| Lipase (such as Lipex, Lipolex, Lipoclean and any combination thereof) | from 0.2 to 1 wt % |
| Other enzyme (such as xyloglucanase, cutinase, pectate lyase, mannanase, bleaching enzyme) | from 0 wt % to 2 wt % |
| Fabric softener (such as montmorillonite clay and/or polydimethylsiloxane (PDMS)) | from 0 wt % to 4 wt % |
| Flocculant (such as polyethylene oxide) | from 0 wt % to 1 wt % |
| Suds suppressor (such as silicone and/or fatty acid) | from 0 wt % to 0.1 wt % |
| Perfume (such as perfume microcapsule, spray-on perfume, starch encapsulated perfume accords, perfume loaded zeolite, and any combination thereof) | from 0.1 wt % to 1 wt % |
| Aesthetics (such as coloured soap rings and/or coloured speckles/noodles) | from 0 wt % to 1 wt % |
| Miscellaneous | balance |

Exemplary Fabric Care Compositions

Formulations 3a-3d: Liquid Fabric Care Compositions

Table 6 provides examples of liquid fabric care compositions which include at least one bluing agent of the present invention. The compositions are shown in Table 6 as Formulations 3a through 3d.

TABLE 6

Liquid Fabric Care Compositions Comprising the Inventive Bluing Agent

| Ingredients | 3a | 3b | 3c | 3d |
|---|---|---|---|---|
| Fabric Softening Active[a] | 13.70% | 13.70% | 13.70% | 13.70% |
| Ethanol | 2.14% | 2.14% | 2.14% | 2.14% |
| Cationic Starch[b] | 2.17% | 2.17% | 2.17% | 2.17% |
| Perfume | 1.45% | 1.45% | 1.45% | 1.45% |
| Phase Stabilizing Polymer[c] | 0.21% | 0.21% | 0.21% | 0.21% |
| Calcium Chloride | 0.147% | 0.147% | 0.147% | 0.147% |
| DTPA[d] | 0.007% | 0.007% | 0.007% | 0.007% |
| Preservative[e] | 5 ppm | 5 ppm | 5 ppm | 5 ppm |
| Antifoam[f] | 0.015% | 0.015% | 0.015% | 0.015% |
| First bis-azo colorant[i] | 30 ppm | | | 15 ppm |
| Second bis-azo colorant[i] | | 30 ppm | | |
| Third bis-azo colorant[i] | | | 30 ppm | 15 ppm |
| Tinopol CBS-X[g] | 0.2 | 0.2 | 0.2 | 0.2 |
| Ethoquad C/25[h] | 0.26 | 0.26 | 0.26 | 0.26 |
| Ammonium Chloride | 0.1% | 0.1% | 0.1% | 0.1% |
| Hydrochloric Acid | 0.012% | 0.012% | 0.012% | 0.012% |
| Deionized Water | Balance | Balance | Balance | Balance |

[a]N,N-di(tallowoyloxyethyl)-N,N-dimethylammonium chloride.
[b]Cationic starch based on common maize starch or potato starch, containing 25% to 95% amylose and a degree of substitution of from 0.02 to 0.09, and having a viscosity measured as Water Fluidity having a value from 50 to 84.
[c]Copolymer of ethylene oxide and terephthalate having the formula described in U.S. Pat. No. 5,574,179 at col.15, lines 1-5, wherein each X is methyl, each n is 40, u is 4, each $R^1$ is essentially 1,4-phenylene moieties, each $R^2$ is essentially ethylene, 1,2-propylene moieties, or mixtures thereof.
[d]Diethylenetriaminepentaacetic acid.
[e]KATHON ® CG available from Rohm and Haas Co.
[f]Silicone antifoam agent available from Dow Corning Corp. under the trade name DC2310.
[g]Disodium 4,4'-bis-(2-sulfostyryl) biphenyl, available from Ciba Specialty Chemicals.
[h]Cocomethyl ethoxylated [15] ammonium chloride, available from Akzo Nobel.
[i]Bis-azo colorants selected from Examples 1-19, preferably with hueing efficiency >10 and wash removability of 30-85%.

Exemplary Unit Dose Compositions

TABLE 7

Liquid detergent compositions according in pouches

| | A | B | | | C | | D | | |
|---|---|---|---|---|---|---|---|---|---|
| Compartment # | Single compartment | 3 compartments | | | 2 compartments | | 3 compartments | | |
| | | 1 | 2 | 3 | 1 | 2 | 1 | 2 | 3 |
| Dosage (g) | 45.0 | 34.0 | 3.5 | 3.5 | 30.0 | 5.0 | 25.0 | 1.5 | 4.0 |
| Ingredients | Weight % | | | | | | | | |
| Alkyl benzene sulfonic acid | 21.0 | 20.0 | 20.0 | 20.0 | 10.0 | | 20.0 | 20.0 | |
| Alkyl sulfate | | | | | 2.0 | | | | |
| C12-14 alkyl 7-ethoxylate | 18.0 | 17.0 | 17.0 | 17.0 | | | 17.0 | 17.0 | |
| Cationic surfactant | | | | | 1.0 | | | | |
| Zeolite A | | | | | 10.0 | | | | |
| C12-18 Fatty acid | 15.0 | 13.0 | 13.0 | 13.0 | | | 18.0 | 18.0 | |
| Sodium acetate | | | | | 4.0 | | | | |
| enzymes | 0-3 | 0-3 | 0-3 | 0-3 | 0-3 | | 0-3 | | |
| Sodium Percarbonate | | | | | 11.0 | | | | |
| TAED | | | | | 4.0 | | | | |
| Organic catalyst [1] | | | | | 1.0 | | | | |
| PAP granule [2] | | | | | | | | | 50 |
| Polycarboxylate | | | | | 1.0 | | | | |
| Ethoxysulfated Hexamethylene Diamine Dimethyl Quat | 2.0 | 2.2 | 2.2 | 2.2 | | | | | |
| Hydroxyethane diphosphonic acid | 0.5 | 0.6 | 0.6 | 0.6 | 0.5 | | | | |
| Ethylene diamine tetra(methylene phosphonic) acid | | | | | | | | 0.4 | |
| Brightener | 0.2 | 0.2 | 0.2 | 0.2 | 0.3 | | 0.3 | | |
| Mineral oil | | | | | | | | | |
| Bluing agent (such as a molecule according to any of the BA formulae given above, in particular, BA10, BA20, BA51, BA55, BA56, BA57, BA60, BA 66, BA69, and BA78 | 0.1 | | 0.05 | | 0.035 | | 0.12 | | |
| Perfume | 1.5 | 1.7 | 1.7 | | 0.6 | | 1.5 | | |
| Water and minors (antioxidant, aesthetics, . . .) | | 10.0 | 10.0 | 10.0 | 4.0 | | | | |

TABLE 7-continued

| | Liquid detergent compositions according in pouches | | | | | | | |
|---|---|---|---|---|---|---|---|---|
| A | B | | | C | | D | | |
| | Compartment # | | | | | | | |
| Single | 3 compartments | | | 2 compartments | | 3 compartments | | |
| compartment | 1 | 2 | 3 | 1 | 2 | 1 | 2 | 3 |
| | Dosage (g) | | | | | | | |
| 45.0 | 34.0 | 3.5 | 3.5 | 30.0 | 5.0 | 25.0 | 1.5 | 4.0 |
| Ingredients | Weight % | | | | | | | |
| Buffers (sodium carbonate, monoethanolamine) [4] | To pH 8.0 for liquids To RA >5.0 for powders | | | | | | | |
| Solvents (1,2 propanediol, ethanol), Sulfate | To 100 p | | | | | | | |

[1] Sulfuric acid mono-[2-(3,4-dihydro-isoquinolin-2-yl)-1-(2-ethyl-hexyloxymethyl)-ethyl]ester as described in U.S. Pat. No. 7,169,744
[2] PAP = Phtaloyl-Amino-Peroxycaproic acid, as a 70% active wet cake
[3] Ethoxylated thiophene, EO ($R_1 + R_2$) = 5
[4] RA = Reserve Alkalinity (g NaOH/dose)

Accordingly, the present invention provides a bluing agent for textile and/or paper substrates comprising at least one chromophore component that comprises a bis-azo colorant and at least one polymeric component. A laundry detergent composition and a rinse added fabric softener containing such a bluing agent is also contemplated herein.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A laundry care composition comprising a laundry care ingredient and a bluing agent, wherein said bluing agent comprises an alkoxylated bis-azo polymeric colorant comprising the following structure:

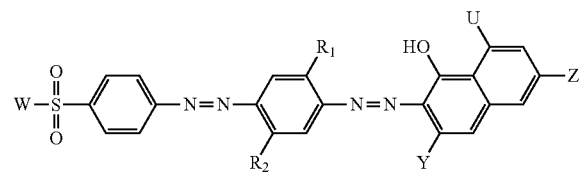

wherein:
$R_1$ and $R_2$ are independently H, alkyl, alkoxy, alkyleneoxy, alkyl capped alkyleneoxy, polyalkyleneoxy, alkyl capped polyalkyleneoxy, urea, or amido;
W is a substituted amino moiety;
U is a hydrogen, an amino group or an amino group substituted with an acyl group;
Y is a hydrogen or a sulfonic acid moiety; and
Z is a sulfonic acid moiety or an amino group substituted with a phenyl group, wherein the W substituted amino moiety substituents are phenyl moieties further substituted with polyalkyleneoxy moieties having at least 4 repeating units, wherein the composition comprises water.

2. A laundry care composition according to claim 1 wherein the alkoxylated bis-azo polymeric colorant's chromophore exhibits an absorbance spectrum maximum in water of from about 520 nanometers to about 640 nanometers.

3. A laundry care composition according to claim 1 wherein the alkoxylated bis-azo polymeric colorant exhibits an absolute hue angle in the range of 265° to 310°.

4. A laundry care composition according to claim 1, wherein $R_1$ is alkoxy and $R_2$ is alkyl.

5. A laundry care composition according to claim 1 wherein the composition additionally comprises imine bleach boosting compounds having the general structure:

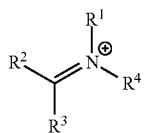

where $R^1$-$R^4$ may be a hydrogen or an unsubstituted or substituted radical selected from the group consisting of phenyl, aryl, heterocyclic ring, alkyl and cycloalkyl radicals.

6. A laundry care composition according to claim 1 wherein the composition additionally comprises dye transfer inhibiting agents.

7. A laundry care composition according to claim 1 wherein the composition is a liquid laundry detergent composition or a liquid rinse-added fabric enhancer composition, optionally in unitized dose form.

8. A laundry care composition according to claim 1, wherein said alkoxylated bis-azo polymeric colorant is present in said laundry care composition in an amount from about 0.0001% to about 1% by weight of said laundry care composition.

* * * * *